(12) United States Patent
Hakkaku et al.

(10) Patent No.: US 11,207,829 B2
(45) Date of Patent: Dec. 28, 2021

(54) MOLDING DEVICE AND MOLDING METHOD

(71) Applicant: MIMAKI ENGINEERING CO., LTD., Nagano (JP)

(72) Inventors: Kunio Hakkaku, Nagano (JP); Hiroyoshi Ohi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 626 days.

(21) Appl. No.: 16/095,944

(22) PCT Filed: Apr. 27, 2017

(86) PCT No.: PCT/JP2017/016704
§ 371 (c)(1),
(2) Date: Oct. 24, 2018

(87) PCT Pub. No.: WO2017/188371
PCT Pub. Date: Nov. 2, 2017

(65) Prior Publication Data
US 2019/0143588 A1    May 16, 2019

(30) Foreign Application Priority Data
Apr. 27, 2016   (JP) .............................. JP2016-089264

(51) Int. Cl.
*B29C 64/182* (2017.01)
*B29C 64/236* (2017.01)
(Continued)

(52) U.S. Cl.
CPC .......... *B29C 64/182* (2017.08); *B29C 64/112* (2017.08); *B29C 64/171* (2017.08);
(Continued)

(58) Field of Classification Search
CPC .... B29C 64/171; B29C 64/176; B29C 64/182
See application file for complete search history.

(56) References Cited

U.S. PATENT DOCUMENTS 4,068,766 A * 1/1978 Schmitt ................ B65G 47/086
                                                                       414/791
5,740,051 A * 4/1998 Sanders, Jr ........... B29C 64/182
                                                                       700/119
(Continued)

FOREIGN PATENT DOCUMENTS

JP       2006521944         9/2006
JP       2015071282         4/2015
(Continued)

OTHER PUBLICATIONS

"International Search Report (Form PCT/ISA/210) of PCT/JP2017/016704," dated Jun. 13, 2017, with English translation thereof, pp. 1-2.

*Primary Examiner* — Atul P. Khare
(74) *Attorney, Agent, or Firm* — JCIPRNET

(57) ABSTRACT

A molding device that molds a stereoscopic molding object through a layered molding method, where after molding of at least one molding object is started and before the molding of the at least one molding object is completed, molding of another molding object is started. The molding device 10, for example, includes an ejection head, and a molding object supporter, the molding object supporter includes, for example, a plurality of molding tables, at least an opposing surface of each molding table is independently movable, an ejection head ejects a material toward the opposing surface of at least one molding table to mold the molding object on the molding table, and at least the opposing surface of the molding table on which the molding object is molded is
(Continued)

moved in a perpendicular direction to move the molding object in the perpendicular direction.

24 Claims, 19 Drawing Sheets

(51) Int. Cl.
| | |
|---|---|
| *B33Y 30/00* | (2015.01) |
| *B33Y 10/00* | (2015.01) |
| *B29C 64/112* | (2017.01) |
| *B29C 64/171* | (2017.01) |
| *B29C 64/176* | (2017.01) |
| *B33Y 50/02* | (2015.01) |
| *B29C 64/245* | (2017.01) |
| *B29C 64/209* | (2017.01) |
| *B29C 64/393* | (2017.01) |
| *B29C 64/218* | (2017.01) |

(52) U.S. Cl.
CPC ......... *B29C 64/176* (2017.08); *B29C 64/209* (2017.08); *B29C 64/218* (2017.08); *B29C 64/236* (2017.08); *B29C 64/245* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 7,255,551 | B2 * | 8/2007 | Taylor | B28B 1/001 |
| | | | | 425/253 |
| 7,597,835 | B2 * | 10/2009 | Marsac | B29C 64/182 |
| | | | | 264/310 |
| 8,916,085 | B2 * | 12/2014 | Jackson | B29C 64/106 |
| | | | | 264/401 |
| 9,002,496 | B2 * | 4/2015 | Elsey | B29C 64/112 |
| | | | | 700/120 |
| 9,592,635 | B2 * | 3/2017 | Ebert | B29C 64/124 |
| 10,226,894 | B2 * | 3/2019 | Houben | B22F 3/10 |
| 10,245,822 | B2 * | 4/2019 | El-Siblani | B29C 64/182 |
| 10,272,664 | B2 * | 4/2019 | Hays | B29C 64/241 |
| 2004/0265413 | A1 * | 12/2004 | Russell | B29C 64/112 |
| | | | | 425/375 |
| 2006/0108712 | A1 * | 5/2006 | Mattes | B33Y 30/00 |
| | | | | 264/308 |
| 2019/0344500 | A1 * | 11/2019 | Cote | B29C 64/25 |

FOREIGN PATENT DOCUMENTS

| | | | |
|---|---|---|---|
| JP | 2015208904 | 11/2015 | |
| WO | WO-2008096105 A1 * | 8/2008 | ........... B29C 64/182 |

* cited by examiner

MOLDING DEVICE AND MOLDING METHOD

CROSS-REFERENCE TO RELATED APPLICATION

This application is a 371 application of the international PCT application serial no. PCT/JP2017/016704, filed on Apr. 27, 2017, which claims the priority benefits of Japan application no. 2016-089264, filed on Apr. 27, 2016. The entirety of each of the abovementioned patent applications is hereby incorporated by reference herein and made a part of this specification.

TECHNICAL FIELD

The present invention relates to a molding device and a molding method.

BACKGROUND ART

In recent years, researches and developments of a molding device (3D molding device, 3D printer) that molds a stereoscopic molding object (3D molding object) are advancing (see e.g., Patent Literature 1). In such a molding device, for example, the molding object is molded by overlapping a plurality of layers of ink formed using an inkjet head.

CITATIONS LIST

Patent Literature

Patent Literature 1: Japanese Unexamined Patent Publication No. 2015-71282

SUMMARY OF INVENTION

Technical Problems

When molding the molding object through such method, a great number of layers of ink need to be formed, and hence a great amount of time is required to mold one molding object. More specifically, for example, one hour or longer is sometimes required per a height of 1 cm in the molding object. Thus, it is conventionally desired to more efficiently carry out the molding of the molding object. The present invention thus provides a molding device and a molding method capable of overcoming such problem.

Solutions to Problems

In order to efficiently carry out the operation of molding, consideration is made to, for example, simultaneously mold a plurality of molding objects. In this case, the operations of the plurality of molding objects usually need to be started at the same time. In this case, however, the molding of all molding objects need to be prepared before the start of molding, for example, and it may become difficult to efficiently carry out the operation of molding.

With regards to this, the inventors of the present application focused on a fact that it is sometimes preferable to start molding (additional molding) of a new molding object in the middle of the molding of a molding object, which molding started first, when attempting to more efficiently carry out the operation of molding. Consideration is made to start the molding of the new molding object in the middle of the molding of the molding object, which molding started first, in one molding device. According to such configuration, for example, the molding of a plurality of molding objects can be more efficiently carried out.

In other words, to overcome the problems described above, the present invention provides a molding device that molds a stereoscopic molding object through a layering and molding method, where after the molding of the at least one molding object is started, molding of another molding object is started before molding of at least one molding object is completed. According to such configuration, for example, the molding can be started at different timing from each other for each of the plurality of molding objects. Furthermore, for example, the molding of the plurality of molding object can be more efficiently carried out.

In the case of the configuration of the conventional molding device, for example, the new molding usually cannot be started until the molding of the molding object, which molding started first, is completed. Even in such a case, the molding can be started with a different molding device by using a plurality of molding devices. However, this requires a plurality of molding devices, which greatly increases the cost of the device.

The inventors of the present application thus conducted further thorough research on a specific configuration for carrying out the molding in the above manner. The inventors contrived a preferable configuration for such specific configuration. More specifically, for example, consideration is made to dispose a plurality of molding tables that can be independently moved in a direction of layering the material of molding, and independently drive each molding able according to the advancement in the operation of molding of the plurality of molding objects. According to such configuration, for example, the timing to start the molding can be differed for every molding. Furthermore, the molding of a new molding object can be started in the middle of molding of the molding object which molding started first.

For a more specific configuration for realizing such operation, the inventors of the present invention considered, for example, a configuration including an ejection head that ejects a material of the molding object; a molding object supporter that supports the molding object being molded on an opposing surface, which is a surface facing the ejection head; an ejection scanning driver that causes the ejection head to carry out an ejection scanning operation of relatively moving with respect to the molding object in a first direction parallel to the opposing surface while ejecting the material; and a perpendicular direction driver that moves the molding object being molded in a perpendicular direction, which is a direction perpendicular to the opposing surface; where the molding object supporter includes a plurality of table portions each having the opposing surface; at least the opposing surface of each table portion is movable in the perpendicular direction independent from the opposing surface of another table portion; the ejection head ejects the material toward the opposing surface of at least one of the table portions to mold the molding object on the table portion; and the perpendicular direction driver moves at least the opposing surface of the table portion, on which the molding object is molded, in the perpendicular direction to move the molding object in the perpendicular direction.

When configured in such manner, for example, the plurality of molding objects can be appropriately molded with one molding device by molding the molding object on the opposing surface of each of the plurality of table portions. Furthermore, the position of the respective opposing surface can be adjusted to the position corresponding to the advancement in the operation of molding in the respective molding object by having the opposing surface of each molding table independently movable. Thus, the timing to start the molding also can be differed for every molding object. More specifically, for example, the molding of a new molding object can be started in the middle of molding of the molding object, which molding started first. Thus, according to such configuration, for example, the operation of molding can be more efficiently and appropriately carried out.

Furthermore, in this case, the plurality of molding objects can be simultaneously molded while commonly using many portions in the molding device. Specifically, for example, the ejection head, the ejection scanning driver or a drive system for scanning the ejection head within a plane (within a two-dimensional plane) parallel to the opposing surface can be commonly used in the molding of the plurality of molding objects without preparing a plurality of sets in accordance with the number of molding objects to mold. Thus, the cost can be greatly reduced, for example, compared to when using a plurality of molding devices.

Furthermore, in this case, for example, as the molding object can be molded on each of the plurality of table portions by carrying out the ejection scanning operation with one ejection head with respect to the plurality of table portions, each molding object can be appropriately molded without changing the operations of the ejection head, the ejection scanning driver, and the like for every molding object even when, for example, the time (molding time) required for the molding of each molding object is different, or when desiring to start the molding of another molding object in the middle of molding a molding object. The overall time required for the molding thus can be appropriately reduced.

Furthermore, when configured in such manner, the timing to start the molding can be freely set, and hence for example, consideration is made to continuously operate the molding device for a long time to mold a great number of molding objects. More specifically, for example, by detaching the molding object, which molding is completed, from the table portion, the next molding can be started at the position of the relevant table portion. Furthermore, the molding can be repeatedly carried out at the position of the respective table portion.

When carrying out such continuous operation, a mechanism (means) for detaching the molding object, which molding is completed, is preferably further used. In this case, the mechanism, for example, may detach the completed molding object with the table portion on which the relevant molding object is mounted. In this case, consideration is made to install a new table portion to a position of the detached table portion. According to such configuration, for example, the new molding can be carried out using a new table portion.

The mechanism for detaching the molding object may, for example, detach only the molding object leaving the table portion. In this case, the new molding can be carried out using the table portion from which the molding object is detached. Furthermore, for example, consideration is made to install a tray and the like in advance on the table portion, and detach the molding object with the tray. In this case, consideration is made to install a new tray on the table portion after detaching the molding object and the tray. According to such configuration, for example, the new molding can be carried out using a new tray installed on the table portion. Furthermore, consideration is made to, for example, temporarily stop the operation of the molding device and detach only the molding object for the operation of detaching the completed molding object from the table portion. Moreover, for example, only the table portion where the molding is completed may be moved from the molding device, and the molding object may be detached from the table portion without temporarily stopping the operation of the molding device. According to such configuration, for example, the molding operation can be continued on another table portion while detaching the molding object, which molding is completed.

Consideration is also made to carry out the operation of additional molding with a configuration other than using the plurality of table portions. Furthermore, in this case, for example, consideration is made to install an additional molding table on one table portion, and carry out the molding of another molding object on the additional molding table. In this case, the additional molding table is, for example, a table-shaped member of a different body from the table portion, and is installed on the table portion before starting molding of another molding object. Even when configured in such manner, for example, the molding of another molding object can be appropriately started after starting the molding of at least one molding object. Furthermore, for example, the molding of the plurality of molding object can be more efficiently carried out.

With respect to a specific operation of molding carried out in each configuration described above, the molding of at least one molding object and the molding of another molding object may be simultaneously carried out in parallel. Furthermore, for the operation of molding carried out in the molding device, the molding of the molding object is carried out based on slice data, which is data indicating a cross-sectional shape of the molding object to mold. In this case, for example, consideration is made to carry out the molding of the molding object based on data in which slice data corresponding to the at least one molding object and slice data corresponding to the another molding object are synthesized. According to such configuration, for example, the molding of a plurality of molding objects can be more efficiently carried out.

With respect to the operation of molding the plurality of molding objects, consideration is also made to sequentially mold the plurality of molding objects, for example, other than the operation of simultaneously carrying out the molding of the plurality of molding objects in parallel. In this case, for example, consideration is made to accept an instruction to mold another molding object while molding at least one molding object, and start the molding of another molding object after the molding of the at least one molding object is completed. Furthermore, in this case, another molding object is molded on the at least one molding object in the direction the material of the molding object is layered. Thus, even when configured in such manner, the molding of the plurality of molding objects can be efficiently carried out.

Furthermore, at the time of the molding of the molding object, for example, whether or not to simultaneously carry out the molding of the plurality of molding objects in parallel may be determined in the controller of the molding device. In this case, for example, consideration is made to make the determination according to the selection of the user. Furthermore, for example, consideration is made to make the determination according to the shape of each molding object. In this case, for example, whether or not to simultaneously carry out the molding of the plurality of molding objects in parallel is determined according to whether or not the simultaneous parallel molding can actually be carried out. Moreover, in this case, for example, when determined to simultaneously carry out the molding in parallel, the molding of another molding object is started before the molding of the molding object already being molded is completed according to the determination.

Furthermore, when determined to not simultaneously carry out the molding of the plurality of molding objects in parallel in the determination, the molding of another molding object is started after the molding of the molding object already being molded is completed. Thus, for example, the plurality of molding objects can be sequentially molded. According to such configuration, for example, the molding of the plurality of molding objects can be more appropriately carried out according to the shape, and the like of the molding object to mold.

Use of a molding method having the features similar to above, and the like can be considered for the configuration of the present invention. In this case as well, for example, effects similar to above can be obtained.

Advantageous Effects of Invention

According to the present example, for example, the operation of molding can be more efficiently and appropriately carried out in the molding device.

BRIEF DESCRIPTION OF DRAWINGS

FIG. 1(a) shows one example of a configuration of a main part of the molding device 10. FIG. 1(b) shows one example of a configuration of a molding object supporter 14 in the molding device 10 along with a Z scanning guide 20 and a Z scanning shaft 22.

FIGS. 2(a) and 2(b) are bottom view and side view, respectively, showing one example of a configuration of the head portion 12. FIG. 2(c) is a block diagram showing one example of a more specific configuration of the controller 40.

FIG. 5(a) shows one example of a state in which molding is carried out using some molding tables 202. FIG. 5(b) shows one example of a configuration of the molding object 50 being molded. FIG. 5(c) shows one example of a state in which the molding based on new molding data started. FIG. 5(d) shows one example of a state in which the molding based on new molding data further started.

FIG. 6(a) shows one example of a state in which the molding is completed on some molding tables 202. FIG. 6(b) shows one example of a state after detaching the completed molding object 50.

FIG. 7(a) shows a configuration of the molding object supporter 14 in the case illustrated in FIGS. 1(a) and 1(b) in a simplified manner. FIG. 7(b) shows an alternative embodiment of the configuration of the molding object supporter 14. FIG. 7(c) shows another alternative embodiment of the configuration of the molding object supporter 14.

FIG. 8(a) is a top view showing one example of a configuration of a molding table 202 in the present alternative embodiment. FIG. 8(b) shows one example of the configuration of the molding object supporter 14 in a state the molding table 202 is installed. FIG. 8(c) shows one example of a configuration of a positioning step pin 206.

FIG. 9(a) shows a further alternative embodiment of the configuration of the molding object supporter 14. FIG. 9(b) shows an alternative embodiment of changing the manner of using the molding table 202. FIG. 9(c) shows a further alternative embodiment of the configuration of the molding device 10.

FIG. 10(a) is a top view showing one example of the configuration of the molding object supporter 14. FIG. 10(b) is a cross-sectional view of the molding object supporter 14 at positions AA, BB, CC shown with a chain dashed line in FIG. 10(a).

FIGS. 11(a) to 11(c) show a state of the molding object 50 being molded, and the like. FIG. 11(d) schematically shows a manner of synthesizing the slice data carried out in the present alternative embodiment.

FIG. 14(a) schematically shows an alternative embodiment of the additional molding. FIG. 14(b) is a flowchart showing one example of the operation of when carrying out the additional molding so that the plurality of molding objects 50 are lined in the up and down direction. FIG. 14(c) schematically shows a further alternative embodiment of the operation of molding.

FIGS. 15(a) and 15(b) show one example of a state of the molding device 10 at each timing.

FIGS. 16(a) and 16(b) show one example of a state of the molding device 10 at each timing.

FIGS. 18(a) and 18(b) show one example of a state of the molding device 10 at each timing.

FIGS. 19(a) and 19(b) show one example of a state of the molding device 10 at each timing.

DESCRIPTION OF EMBODIMENTS

Figure 1A:
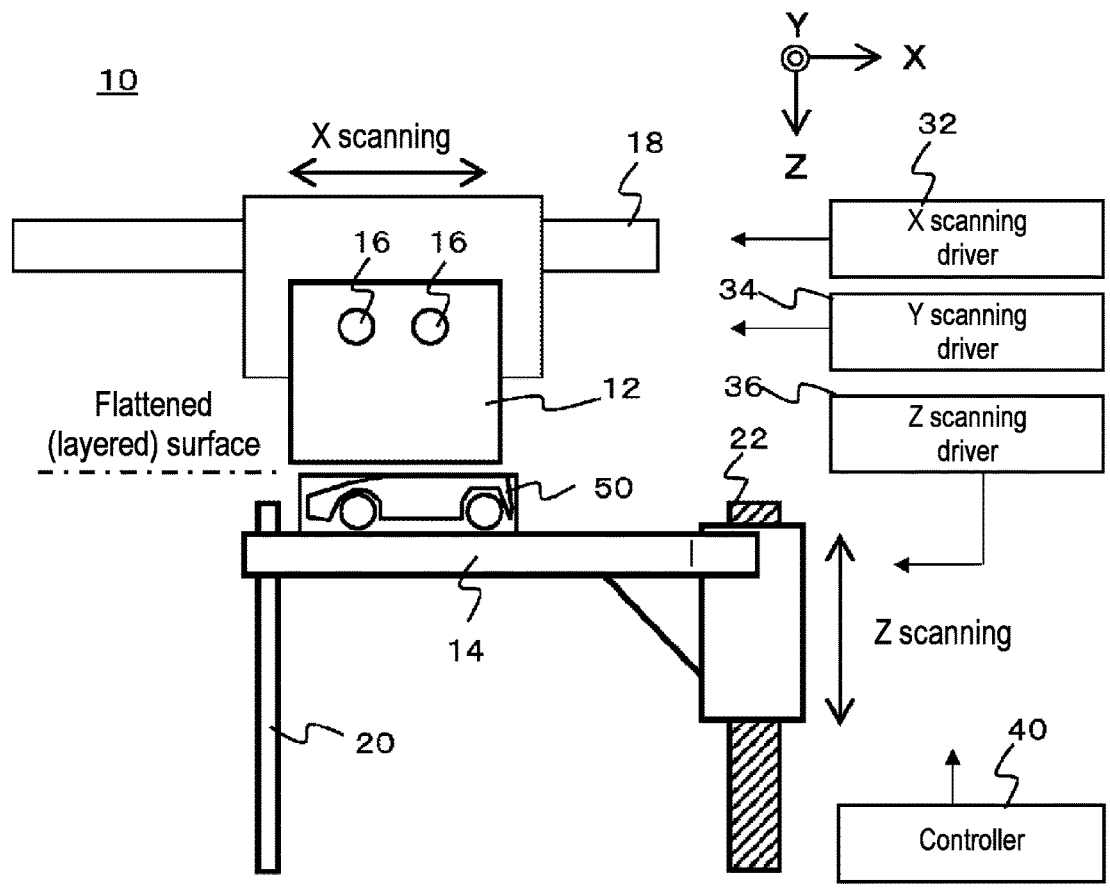
FIGS. 1(a) and 1(b) are views showing one example of a molding device 10 according to one embodiment of the present invention.
Figure 1B:
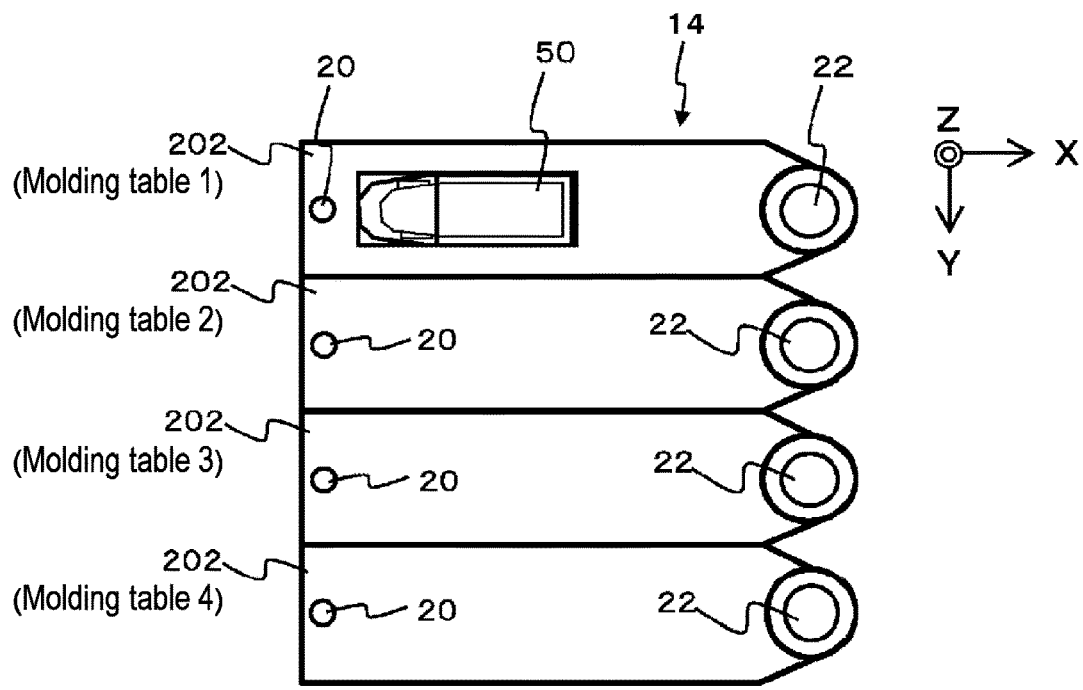

Hereinafter, an embodiment according to the present invention will be described with reference to the drawings. FIGS. 1(a) and 1(b) show one example of a molding device 10 according to one embodiment of the present invention. FIG. 1(a) shows one example of a configuration of a main part of the molding device 10.

Other than the points described below, the molding device 10 may have a configuration same as or similar to a known molding device. More specifically, other than the points described below, the molding device 10 may have a configuration same as or similar to, for example, a known molding device that carries out molding by ejecting a droplet (ink droplet) to become the material of a molding object 50 using an inkjet head. Furthermore, other than the illustrated configuration, the molding device 10 may also include, for example, various types of configurations necessary for molding, coloring, and the like of the molding object 50.

In the present example, the molding device 10 is a device that molds the molding object 50 through the layered molding method. In this case, the layered molding method is, for example, a method of molding the molding object 50 by overlapping a plurality of layers. The molding object 50 is, for example, a stereoscopic three-dimensional structural object. Furthermore, in the present example, the molding device 10 is a device that molds a stereoscopic molding object 50, and includes a head portion 12, a molding object supporter 14, a Y scanning guide 16, an X scanning guide 18, a Z scanning guide 20, a Z scanning shaft 22, an X scanning driver 32, a Y scanning driver 34, a Z scanning driver 36, and a controller 40.

The head portion 12 is a portion (recording unit) that ejects a droplet to become the material of the molding object 50, and ejects the ink that cures according to a predetermined condition and cures the ink to form each layer configuring the molding object 50 in an overlapping manner. Furthermore, in the present example, an ultraviolet curable ink that cures by irradiation of an ultraviolet light is used for the ink. In this case, the ink is, for example, liquid ejected from the inkjet head. The inkjet head is, for example, an ejection head that ejects liquid (droplet) through an inkjet scheme. Moreover, in the present example, the head portion 12 includes a plurality of inkjet heads, ultraviolet light sources, and the like. In this case, the inkjet head is an example of an ejection head that ejects the material of the molding object 50.

Moreover, in the present example, the head portion 12 ejects an ink configuring the molding object 50 by carrying out a main scanning operation (Y scanning) of ejecting the material of molding while moving in a main scanning direction (Y direction in the figure) set in advance. In this case, when referring to the head portion 12 carrying out the main scanning operation, this means that, for example, the inkjet head in the head portion 12 carries out the main scanning operation. In the present example, the main scanning operation is an example of an ejection scanning operation. Furthermore, the head portion 12 further carries out a sub-scanning operation (X scanning), for example, between the main scanning operations, as necessary. In this case, when referring to the head portion 12 carrying out the sub-scanning operation, this means that, for example, the inkjet head in the head portion 12 carries out the sub-scanning operation. Furthermore, the sub-scanning operation is, for example, an operation of relatively moving with respect to the molding object supporter 14 in a sub-scanning direction (X direction in the figure) orthogonal to the main scanning direction. The sub-scanning operation may be an operation of relatively moving with respect to the molding object supporter 14 in the sub-scanning direction by a feeding amount set in advance. A more specific configuration of the head portion 12 will be described in detail later.

The molding object supporter 14 is a table-shaped member that supports the molding object 50 being molded, and is arranged at a position facing the inkjet head in the head portion 12, and supports the molding object 50 being molded on an upper surface, which is a surface facing the inkjet head. In this case, the upper surface of the molding object supporter 14 is one example of an opposing surface, which is a surface facing the head portion 12. Furthermore, the molding object supporter 14 has a configuration in which at least the upper surface is movable in a layering direction (Z direction in the figure), and moves at least the upper surface with the advancement in the molding of the molding object 50 by being driven by the Z scanning driver 36. In this case, the layering direction is, for example, a direction in which the material of molding is layered in the layered molding method. More specifically, in the present example, the layering direction is a direction orthogonal to the main scanning direction and the sub-scanning direction.

A more specific configuration of the molding object supporter 14 will be further described in detail later. In the present example, the layering direction is one example of a perpendicular direction, which is a direction perpendicular to the opposing surface. The main scanning direction is one example of a first direction parallel to the opposing surface. The sub-scanning direction is one example of a second direction, which is a direction orthogonal to the first direction and the perpendicular direction.

The Y scanning guide 16 is a member that guides the movement of the head portion 12 in the main scanning direction, and for example, guides the movement of the head portion 12 at the time of the main scanning operation. A rail member and the like including two parallel linear members extending in the main scanning direction, for example, can be used for the Y scanning guide 16. Furthermore, the X scanning guide 18 is a member that guides the movement of the head portion 12 in the sub-scanning direction, and for example, guides the movement of the head portion 12 at the time of the sub-scanning operation.

The Z scanning guide 20 is a member that guides the movement of the molding object supporter 14 in the layering direction. In this case, the movement of the molding object supporter 14 may be the movement of at least the upper surface in the molding object supporter 14. The scanning shaft 22 is a shaft member that controls the movement amount of the molding object supporter 14 in the layering direction. In the present example, the Z scanning shaft 22 is a ball screw extending in the layering direction, and is rotated according to a driving force received from the Z scanning driver 36 to move the molding object supporter 14. A more specific configuration of the Z scanning guide 20 and the Z scanning shaft 22 will be described in detail later with a more specific configuration of the molding object supporter 14.

The X scanning driver 32 is a driver that causes the head portion 12 to carry out the sub-scanning operation. In the present example, the X scanning driver 32 is one example of a second direction driver, and causes the head portion 12 to carry out the sub-scanning operation by moving the head portion 12 in the sub-scanning direction along the X scanning guide 18 between the main scanning operations. The X scanning driver 32 thus shifts a region of ejecting the material of molding in the next main scanning operation in the sub-scanning direction by a feeding amount in the sub-scanning direction.

The movement of the head portion 12 in the sub-scanning operation may be a relative movement with respect to the molding object supporter 14. Furthermore, the relative movement with respect to the molding object supporter 14 may be, for example, a relative movement with respect to the molding object 50 instructed by the molding object supporter 14. In an alternative embodiment of the configuration of the molding device 10, the position of the head portion 12 in the sub-scanning direction may be fixed, and the molding object supporter 14 side may be moved. More specifically, in the illustrated configuration, the entire mechanism for the main scanning operation including the head portion 12, and the like is moved to carry out the sub-scanning operation. However, instead of the mechanism side for the main scanning operation, the mechanism side for Z scanning including the molding object supporter 14, and the like may be moved.

The Y scanning driver 34 is a driver that causes the head portion 12 to carry out the main scanning operation, and causes the inkjet head in the head portion 12 to eject ink, which is a material of molding, in each main scanning operation based on molding data indicating the molding object 50 to be molded. The Y scanning driver 34 thereby causes the head portion 12 to eject a material necessary for molding the molding object 50.

In the present example, the Y scanning driver 34 is one example of an ejection scanning driver. The movement of the head portion 12 in the main scanning operation may be a relative movement with respect to the molding object supporter 14. Thus, in an alternative embodiment of the configuration of the molding device 10, the position of the head portion 12 in the main scanning direction may be fixed and the molding object supporter 14 side may be moved.

At the time of the main scanning operation of the present example, the Y scanning driver 34 further carries out the drive of an ultraviolet light source in the head portion 12. More specifically, for example, the Y scanning driver 34 lights the ultraviolet light source at the time of the main scanning operation to cure the ink that landed on a surface to be molded of the molding object 50. The surface to be molded of the molding object 50 is, for example, a surface where a next layer of ink is formed by the head portion 12.

The Z scanning driver 36 is a driver that moves the molding object supporter 14 in the layering direction. In this case, when referring to moving the molding object supporter 14 in the layering direction, this means, for example, moving the position of at least the upper surface in the molding object supporter 14. Furthermore, when referring to moving the upper surface of the molding object supporter 14, this may be, for example, moving a region where the molding object 50 is mounted in the upper surface of the molding object supporter 14.

Furthermore, in the present example, the Z scanning driver 36 is one example of a perpendicular direction driver, and moves the molding object supporter 14 in the layering direction to cause the head portion 12 to carry out scanning (Z scanning) in the Z direction. The Z scanning driver 36 thereby changes a distance between the inkjet head in the head portion 12 and the upper surface of the molding object supporter 14. This distance may be, for example, a distance between a nozzle surface where a nozzle is formed in the inkjet head and the upper surface of the molding object supporter 14. The Z scanning driver 36 moves the upper surface of the molding object supporter 14 in accordance with the advancement in the molding of the molding object 50 to adjust a distance between the surface to be molded in the molding object 50 in the middle of being molded and the head portion 12. In this case, the Z scanning driver 36, for example, rotates the Z scanning shaft 22, which is a ball screw, in a predetermined direction by a necessary amount to move the upper surface of the molding object supporter 14.

The controller 40 is, for example, a portion including a CPU of the molding device 10, and controls the operation of molding of the molding object 50 by controlling each portion of the molding device 10. The controller 40, for example, preferably controls each portion of the molding device 10 based on the shape information, the color image information, and the like of the molding object 50 to be molded. A more specific configuration of the controller 40, the control by the controller 40 and the like will be described in detail later. According to the present example, the molding object 50 can be appropriately molded.

Next, a more specific configuration of the molding object supporter 14 in the present example will be described. FIG. 1(b) shows one example of a configuration of a molding object supporter 14 in the molding device 10 along with a Z scanning guide 20 and a Z scanning shaft 22.

In the present example, the molding object supporter 14 includes a plurality of molding tables 202 lined in the main scanning direction as shown as molding tables 1 to 4 in the figure. Each of the plurality of molding tables 202 is an example of a table portion, and respectively includes an upper surface facing the inkjet head in the head portion 12. Furthermore, at least the upper surface in the respective molding table 202 is configured to be movable in the layering direction independent from the other molding tables 202.

More specifically, in the present example, the respective molding table 202 is a table-shaped member (table) which is entirely movable in the layering direction independent from the other molding tables 202. Furthermore, as shown in FIG. 1(b), the molding device 10 includes a plurality of Z scanning guides 20 and a plurality of Z scanning shafts 22 in correspondence with the configuration using the plurality of molding tables 202.

In this case, for example, the Z scanning guide 20 is arranged on one side, and the Z scanning shaft 22 is arranged on the other side in the sub-scanning direction of the respective molding table 202. Furthermore, the respective Z scanning guide 20 and the Z scanning shaft 22 thereby move the respective molding table 202 in the layering direction independent from each other.

Furthermore, in the present example, the molding device 10 can simultaneously mold a plurality of molding objects 50. In this case, when referring to simultaneously molding the plurality of molding objects 50, this means, for example, carrying out molding with the plurality of molding objects 50 supported on the upper surface of the molding object supporter 14. More specifically, when referring to simultaneously molding the plurality of molding objects 50, this may mean, for example, ejecting the material of molding with respect to the plurality of molding objects 50 being molded in one main scanning operation.

Furthermore, in FIG. 1(b), only one molding object 50 is illustrated for the sake of convenience of illustration. However, when simultaneously molding the plurality of molding objects 50, the molding object supporter 14 supports each of the plurality of molding objects 50 at respective different positions on the upper surface. More specifically, in this case, each of the plurality of molding objects 50 is, for example, supported at the upper surface of the molding table 202 different from each other.

Furthermore, in this case, the Z scanning driver 36 individually moves the respective molding table 202 in the layering direction to individually move the molding object 50 being molded in the layering direction. The molding table 202 and the molding object 50 are thus moved in the layering direction in accordance with, for example, the advancement in the molding of the respective molding object 50. More specifically, in the present example, the Z scanning driver 36 individually moves each of the plurality of molding tables 202 by individually controlling the rotation amount of the respective Z scanning shaft 22, which is the ball screw.

When configured in such manner, for example, the plurality of molding objects can be appropriately molded with one molding device 10 by molding the molding object 50 on the upper surface of each of the plurality of molding tables 202. Furthermore, the position of the respective upper surface can be adjusted to the position corresponding to the advancement in the operation of molding in the respective molding object 50 by having the respective molding table 202 independently movable in the layering direction.

Furthermore, when configured in such manner, the plurality of molding objects 50 to be molded simultaneously can have, for example, the timing to start molding differed from each other, and the like. Thus, for example, the molding of a new molding object 50 can be started in the middle of molding of the molding object 50, which molding started first. More specifically, in this case, for example, in the middle of molding one molding object 50 on one molding table 202, the molding device 10 starts the molding of another molding object 50 on another molding table 202. Thus, according to the present example, for example, the operation of molding can be more efficiently and appropriately carried out.

Furthermore, in this case, for example, the plurality of molding objects 50 can be simultaneously molded while commonly using many portions in the molding device 10. More specifically, for example, the head portion 12, the X scanning driver 32, the Y scanning driver 34, and the like do not need to be prepared in a plurality of sets in accordance with the number of molding objects 50. Thus, according to the present example, for example, the cost can be greatly reduced compared to when using a plurality of molding devices.

Furthermore, in this case, for example, as the molding object 50 can be molded on each of the plurality of molding tables 202 by carrying out the main scanning operation, and the like with one head portion 12 with respect to the plurality of molding tables 202, each molding object 50 can be appropriately molded without changing the operations of the head portion 12, the Y scanning driver 34, and the like for every molding object 50 even when, for example, the time (molding time) required for the molding of each molding object 50 is different, when desiring to start the molding of another molding object 50 in the middle of molding a molding object 50 on any one of the molding tables 202. The overall time required for the molding thus can be appropriately reduced.

Furthermore, in this case, the timing to start the molding can be freely set for the respective molding object 50, and hence for example, consideration is made to continuously operate the molding device 10 for a long time to mold a great number of molding objects 50. More specifically, for example, by detaching the molding object 50, which molding is completed, from the molding table 202, the next molding can be started at the position of the relevant molding table 202. Furthermore, the molding can be repeatedly carried out at the position of the respective molding table 202.

Furthermore, in this case, the fineness (resolution) of molding can be changed for every molding object 50 in the respective molding table 202. More specifically, for example, the plurality of molding objects 50 having different resolutions from each other can be simultaneously molded by differing the ejection amount of one droplet ejected from the head portion 12 even if the moving speed of the head portion 12 in the main scanning operation is the same. Furthermore, for example, the plurality of molding objects 50 in which the resolution in the Z direction is different from each other can be molded by differing a distance (scanning pitch) of moving the molding table 202 by the Z scanning driver 36 for every molding table 202.

Figure 2A:
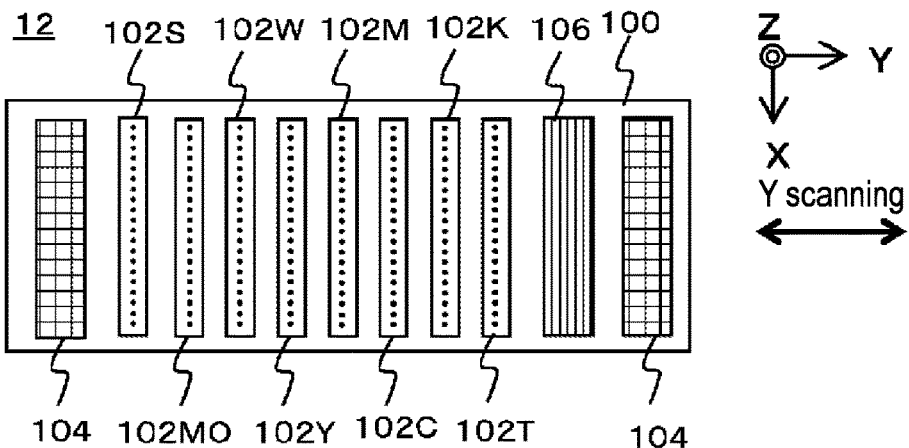
FIGS. 2(a) to 2(c) are views showing one example of a more detailed configuration of a head portion 12 and a controller 40.
Figure 2B:
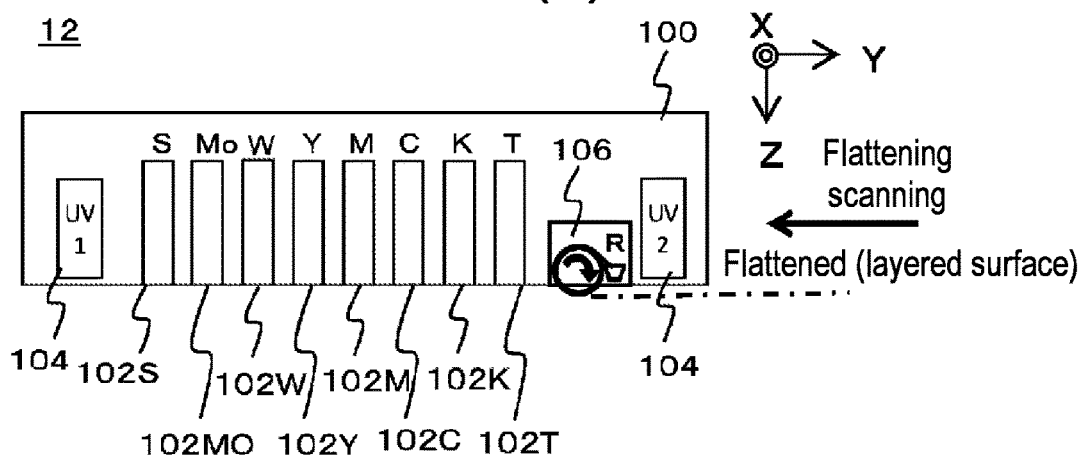

Next, an example of a more detailed configuration of the head portion 12 and the controller 40 will be described. FIGS. 2(*a*) and 2(*b*) show one example of a more detailed configuration of the head portion 12 and the controller 40. FIGS. 2(*a*) and 2(*b*) are bottom view and side view, respectively, showing one example of a configuration of the head portion 12. In this case, the bottom view is a view seen from the molding object supporter 14 (see FIGS. 1(*a*) and 1(*b*)) side. The side view is a view showing an arrangement of each configuration of the head portion 12 within a YZ plane.

In the present example, the head portion 12 includes a carriage 100, a plurality of inkjet heads, a plurality of ultraviolet light sources 104, and a flattening roller unit 106. The carriage 100 is a holding member that holds other configurations in the head portion 12. The head portion 12 includes, for the plurality of inkjet heads, an inkjet head 102S, an inkjet head 102MO, an inkjet head 102W, an inkjet head 102Y, an inkjet head 102M, an inkjet head 102C, an inkjet head 102K, and an inkjet head 102T (hereinafter referred to as a plurality of inkjet heads 102).

Each of the plurality of inkjet heads 102 is one example of an ejection head, and ejects ink to become a material to use for molding through an inkjet scheme toward an upper surface of at least one of the molding tables 202 (see FIGS. 1(*a*) and 1(*b*)). Furthermore, each inkjet head 102 includes a nozzle row, in which a plurality of nozzles are lined in a sub-scanning direction, on a surface facing the molding object supporter 14. The nozzle of each inkjet head 102 ejects ink in a direction toward the molding object supporter 14. In this case, ejecting the ink means, for example, ejecting a droplet (ink droplet) of ink. Furthermore, a known inkjet head can be suitably used for each inkjet head 102.

The material used for molding is, for example, material of molding and support material. In this case, the material of molding is, for example, material for configuring the molding object 50 to become a product of molding. Furthermore, the support material is a material of a support layer formed at a periphery of the molding object 50. In this case, the support layer is, for example, a layered structural object that supports the molding object 50 by surrounding the outer periphery of the molding object 50 being molded. The support layer is formed as necessary at the time of molding of the molding object 50 and removed after the completion of the molding. More specifically, in the head portion 12 of the present example, the support material is ejected by the inkjet head 102S. Furthermore, the material of molding is ejected by the inkjet heads other than the inkjet head 102S.

More specifically, in the present example, an ultraviolet curable ink is used, as described above, for the support material and the material of molding.

The inkjet head 102S is an inkjet head that ejects an ink (support ink) to become the material of the support layer. A water soluble material that can be dissolved in water after the molding of the molding object 50 is preferably used for the material of the support layer. In this case, a material which curing degree by the ultraviolet light is weaker and which can be easily decomposed than the material configuring the molding object 50 is preferably used. For example, a known material for the support layer can be suitably used for the material of the support layer.

The inkjet head 102MO is an inkjet head that ejects an ink to use for the molding of the interior of the molding object 50, and forms an outer appearance shape by the shape data of the molding object 50. For example, at the time of molding of the molding object 50, which surface is colored, the inkjet head 102MO ejects an ink to use for the molding of an inner side of a colored region. Furthermore, in the present example, the inkjet head 102MO ejects a molding ink (model material MO) of a predetermined color. The molding ink may be, for example, an ink dedicated to molding.

In an alternative embodiment of the configuration of the head portion 12, for example, the inkjet head 102MO may be omitted. In this case, consideration is made to use an ink of another color for the molding ink instead of using the ink dedicated to molding. More specifically, in this case, for example, consideration is made to use one of an ink of white color (W), an ink of each color of Y (yellow), M (magenta), C (cyan), and K (black), or clear ink for the molding ink. Two or more of such inks may be combined to be used as the molding ink.

The inkjet head 102W is an inkjet head that ejects white (W) ink. The inkjet head 102Y, the inkjet head 102M, the inkjet head 102C, and the inkjet head 102K are inkjet heads for coloring that respectively ejects an ink for coloring of a color different from each other. In the present example, the inkjet head 102Y, the inkjet head 102M, the inkjet head 102C, and the inkjet head 102K each ejects an ink of each color of YMCK. The inkjet head 102T is an inkjet head that ejects a clear ink. In this case, the clear ink is, for example, a colorless transparent (T) ink.

The head portion 12 includes a plurality of nozzle rows corresponding to the type of ink to use for molding by including the plurality of inkjet heads 102. In this case, the ink to use for molding is, the support ink, the molding ink, the white ink, the ink for coloring (Y, M, C, K), the clear ink, and the like described above. Furthermore, the head portion 12 ejects the inks in the Z direction while moving (scanning) in the main scanning direction at the time of the main scanning operation.

The plurality of ultraviolet light sources 104 have a configuration for curing the ink, and generate an ultraviolet light for curing the ultraviolet curable ink. For example, UVLED (ultraviolet LED) and the like can be suitably used for the ultraviolet light source 104. Furthermore, consideration is also made to use metal halide lamp, mercury lamp, and the like for the ultraviolet light source 104. Moreover, in the present example, each of the plurality of ultraviolet light sources 104 is arranged on one end side and the other end side in the main scanning direction in the head portion 12 so as to sandwich the plurality of inkjet heads 102 in between.

The flattening roller unit 106 has a configuration for flattening the layer of ink formed during the molding of the molding object 50. In the present example, the flattening roller unit 106 includes at least a flattening roller, and is arranged between the arrangement of the plurality of inkjet heads 102 and one ultraviolet light source 104. In this case, for example, the flattening roller flattens the layer of ink by making contact with a surface (layered upper surface) of the layer of ink and removing one part of the ink before being cured at the time of the main scanning operation. More specifically, in the illustrated configuration, the flattening roller in the flattening roller unit 106 rotates in a clockwise direction in the figure.

In the present example, the head portion 12 includes only one flattening roller unit 106. In this case, the flattening roller unit 106 is arranged, for example, between the ultraviolet light source 104 on one end side in the head portion 12 and the arrangement of the plurality of inkjet heads 102. Furthermore, in this case, the Y scanning driver 34 at least causes the head portion 12 to carry out the main scanning operation in a direction (one direction in the main scanning direction) the flattening roller unit 106 becomes the backward side than the arrangement of the inkjets. The flattening roller unit 106 flattens the layer of ink with a flattening (layering) surface during the main scanning operation in a direction indicated as the flattening scanning in FIG. 2(b). Furthermore, the Y scanning driver 34 may cause the head portion 12 to carry out a bidirectional main scanning operation. In this case, the flattening roller unit 106, for example, flattens the layer of ink only during the main scanning operation in one direction. More specifically, in the case of the illustrated configuration, the flattening roller unit 106 flattens the layered upper surface in the molding object 50 being molded in the main scanning operation in which the head portion 12 is moved from the right side toward the left side as shown as the flattening scanning in the figure.

Figure 2C:
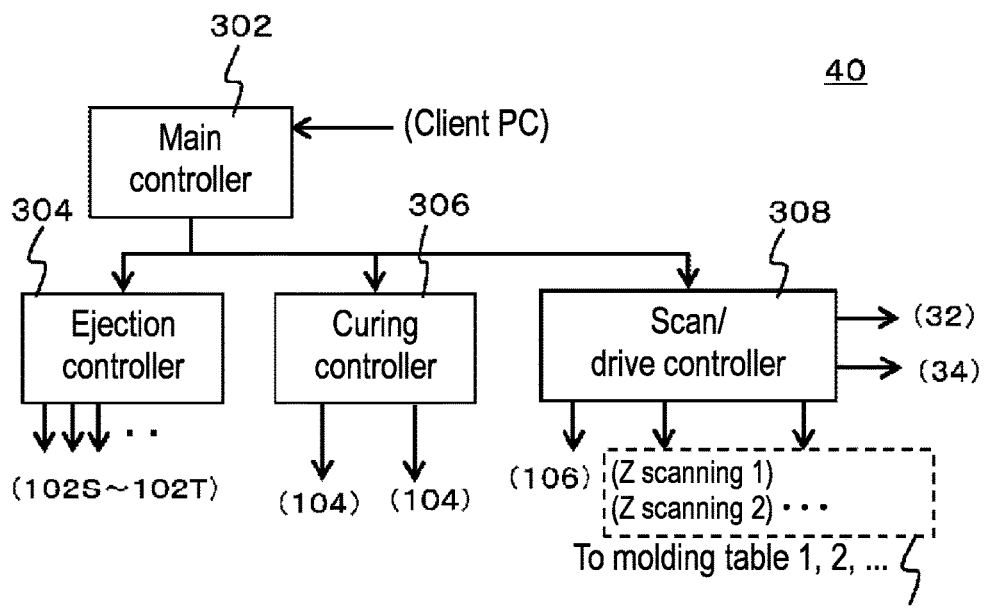

FIG. 2(c) is a block diagram showing one example of a more specific configuration of the controller 40. In the present example, the controller 40 functionally includes a main controller 302, an ejection controller 304, a curing controller 306, and a scan/drive controller 308. Such functional configurations may be, for example, physically different configurations. For example, the operations of a plurality of functional configurations may be carried out with one physical configuration.

The main controller 302 is a portion that carries out the control of the entire molding device 10, and for example, controls the operation of each portion of the molding device 10 by controlling the operations of the ejection controller 304, the curing controller 306, and the scan/drive controller 308. The main controller 302 may be, for example, a CPU of the molding device 10. In the present example, the main controller 302, for example, receives molding data indicating the molding object 50 to mold from a client PC, and controls the operations of the ejection controller 304, the curing controller 306, and the scan/drive controller 308 based on the molding data. In this case, the molding data may be, for example, data indicating shape and color of the molding object 50. Furthermore, the molding data may be data further indicating shape, and the like of the support layer formed at the periphery of the molding object 50. The main controller 302, for example, generates slice data indicating a cross-sectional shape of the molding object 50 and the support layer based on the received molding data. The operation of molding by the molding device 10 is controlled based on the slice data. Furthermore, the main controller 302 may receive the molding data indicating the molding object 50 by the slice data generated in advance from the client PC.

The ejection controller 304 carries out the control of causing each inkjet head (inkjet heads 102S to 102T) in the head portion 12 to eject ink. More specifically, the ejection controller 304 causes each inkjet head to eject ink based on the molding data in each main scanning operation. The curing controller 306 carries out a control of lighting by the ultraviolet light source 104 in the head portion 12. More specifically, the ejection controller 304 lights the ultraviolet light source 104 to cure the ink ejected by each inkjet head in each main scanning operation.

The scan/drive controller 308 carries out a control of the scanning operation in each direction. More specifically, the scan/drive controller 308 controls the operations of the X scanning driver 32, the Y scanning driver 34, and the Z scanning driver 36 to cause the head portion 12 to carry out the main scanning operation, the sub-scanning operation, and the Z scanning. Furthermore, in this case, the scan/drive controller 308 independently moves each of the plurality of molding tables 202 (see FIGS. 1(a) and 1(b)) in the molding object supporter 14 in the control of Z scanning. Thus, the scan/drive controller 308, for example, causes the plurality of molding tables 202 indicated as molding tables 1, 2 and the like in the figure to carry out an independent Z scanning indicated as Z scanning 1, Z scanning 2, and the like in the figure. Furthermore, in the present example, the scan/drive controller 308 further carries out the control of the operation of flattening by the flattening roller unit 106 in the head portion 12. According to the present example, the operation of each portion of the molding device 10 can be appropriately controlled.

Next, the operation of molding carried out by the molding device 10 will be described in more detail. As described above as well, in the present example, the molding device 10 carries out the molding of the molding object 50 by causing the head portion 12 to carry out the main scanning operation. Furthermore, the plurality of molding objects 50 can be simultaneously molded by using the plurality of molding tables 202 that can be independently Z scanned.

More specifically, when molding the plurality of molding objects 50, the Y scanning driver 34 (see FIGS. 1(a) and 1(b)) causes the head portion 12 to carry out the main scanning operation so that the head portion 12 passes above the molding table 202 on which the molding object 50 being molded is placed. Furthermore, in each main scanning operation, the head portion 12 ejects various types of inks toward the upper surfaces of the plurality of molding tables 202 to mold the molding object 50 on each of the plurality of molding tables 202. In this case, ejecting the ink toward the upper surfaces of the plurality of molding tables 202 means, for example, ejecting the ink toward the surface to be molded of the molding object 50 being molded on the molding table 202.

Moreover, in this case, the Z scanning driver 36 causes each molding table 202 to carry out the Z scanning according to the advancement in the operation of molding on each of the plurality of molding tables 202. When referring to carrying out the Z scanning according to the advancement in the operation of molding, this means, for example, moving the molding table 202 in the Z direction so that the distance between the molding object 50 being molded on each molding table 202 and the lower end of the flattening roller unit 106 in the head portion 12 becomes a predetermined distance. According to such configuration, for example, the position of each molding table 202 can be appropriately adjusted in accordance with the height (Z direction height) and the resolution (Z direction thickness of one layer) of the molding object 50 being molded. Thus, according to the present example, for example, each of the plurality of molding tables 202 can be appropriately moved individually. Furthermore, the position of each molding table 202 can be appropriately adjusted in accordance with the height of each molding object 50 even when, for example, the height of the molding objects 50 is different due to the difference in the timing to start the molding, and the like.

In this case, the controller 40 preferably sets a scanning width, which is a width to move the head portion 12 at the time of the main scanning operation, according to the position of the molding table 202 to use for molding. More specifically, in the present example, the controller 40 sets the scanning width according to the width in the main scanning direction in which the molding table 202, on which the molding object 50 being molded is placed, exists. According to such configuration, for example, each main scanning operation can be more efficiently carried out without increasing the scanning width more than necessary. Furthermore, for example, the time required for each main scanning operation thus can be suppressed, and the time required for molding can be appropriately reduced.

Furthermore, in this case, when the molding of one of the molding objects 50 of the plurality of molding objects 50 being molded simultaneously is completed, the scanning width is preferably reset thereafter according to the molding table 202 that still carries out molding thereafter. More specifically, in this case, the controller 40, for example, resets the scanning width according to the width in the main scanning direction in which the molding table 202, on which the molding object 50 being molded is placed, exists of the molding tables 202 other than the molding table 202 on which the molding object 50, which molding is completed, is placed.

As described above, in the present example, the plurality of molding tables 202 can be independently moved, and thus the molding of a new molding object 50 can be started with another molding table 202 while carrying out the molding of the molding object 50 with some molding tables 202. In this case, for example, the scanning width is reset according to the molding table 202 to use after the start of the new molding. Furthermore, in this case, the scanning width after the start of the new molding is preferably selected to be as small as possible for the molding table 202 for carrying out the new molding. More specifically, the controller 40 selects the molding table 202 to start the new molding so that the width in the main scanning direction in which the molding table 202, on which the molding object 50 being molded is placed, exists becomes a minimum (shortest) in a state after the new molding on another molding table 202 has started.

When enabling the start of new molding, the controller 40, for example, manages the molding table 202, on which the molding of the molding object 50 is not carried out, as the molding table 202 that can start the new molding. Furthermore, in this case, the molding table 202 after the molding is completed is, for example, preferably handled as a molding table 202 that can start the new molding after the molding object 50 is detached. More specifically, when the molding of the molding object 50 is completed on one of the molding tables 202 and the molding object 50 is detached from the position of such molding table 202, the controller 40 may, for example, handle the molding table 202 at the position the molding object 50 is detached as a molding table 202 that can start the new molding.

According to such configuration, for example, the plurality of molding object 50 can be sequentially molded with the respective molding table 202. Thus, a great number of molding objects 50 can be more efficiently molded by continuously operating the molding device 10.

Figure 3:
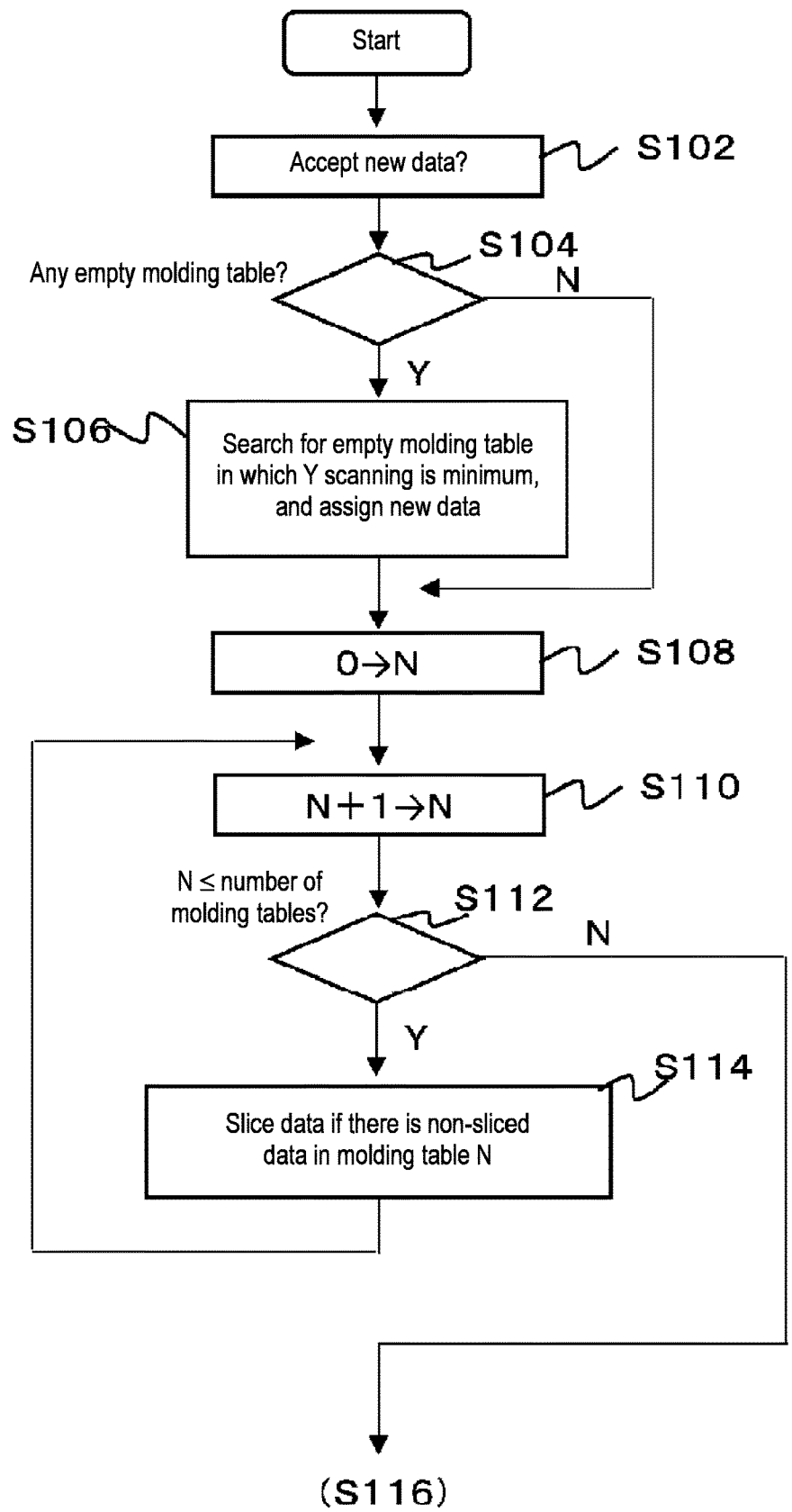
FIG. 3 is a flowchart showing one example of a control method for controlling an operation of molding by the molding device 10.
Figure 4:
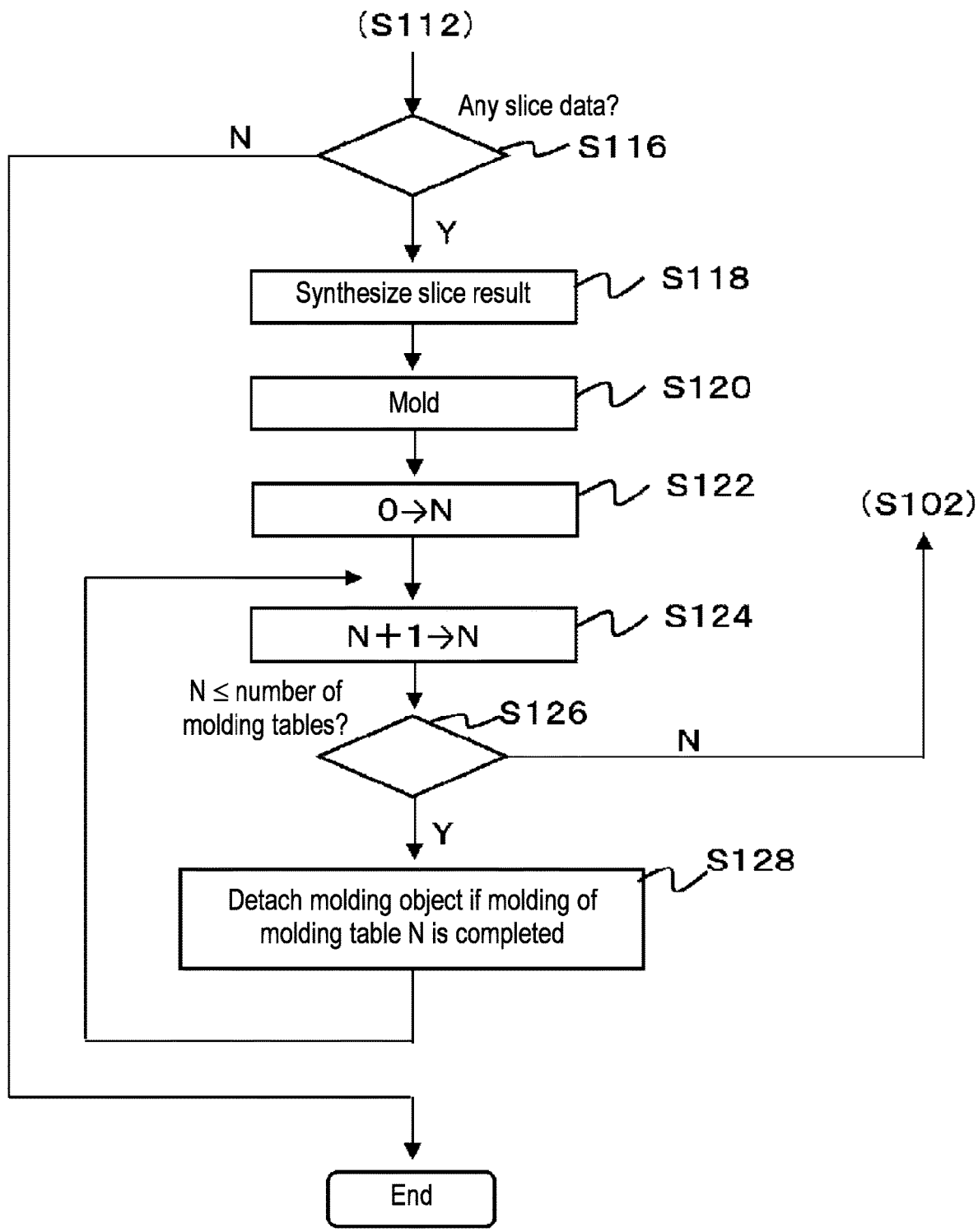
FIG. 4 is a flowchart showing one example of a control method for controlling an operation of molding by the molding device 10.
Figure 5A:
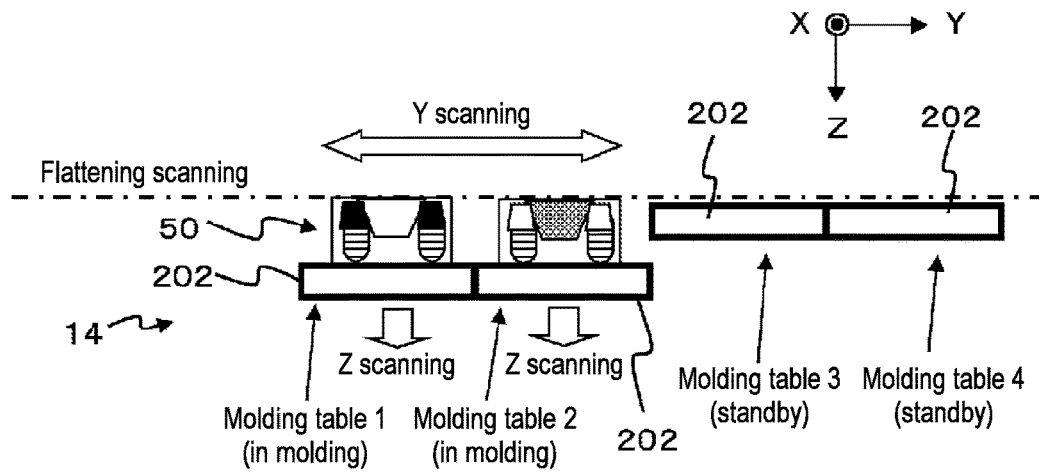
FIGS. 5(a) to 5(d) are views showing one example of a molding procedure of when simultaneously molding a plurality of molding objects 50.
Figure 5B:
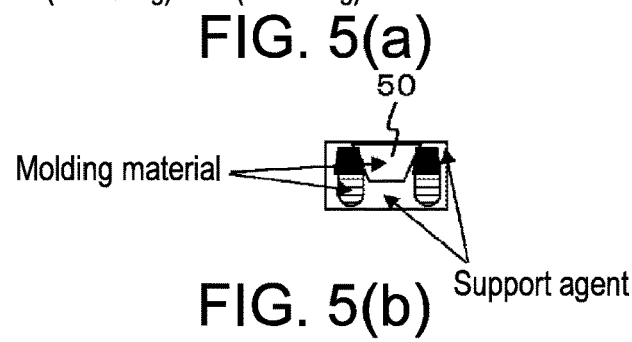
Figure 5C:
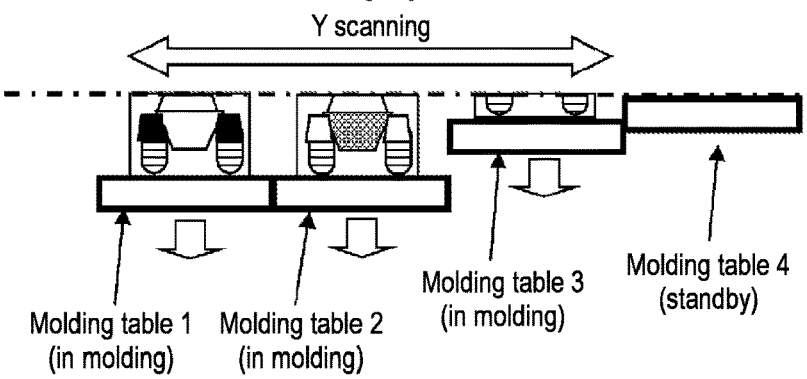
Figure 5D:
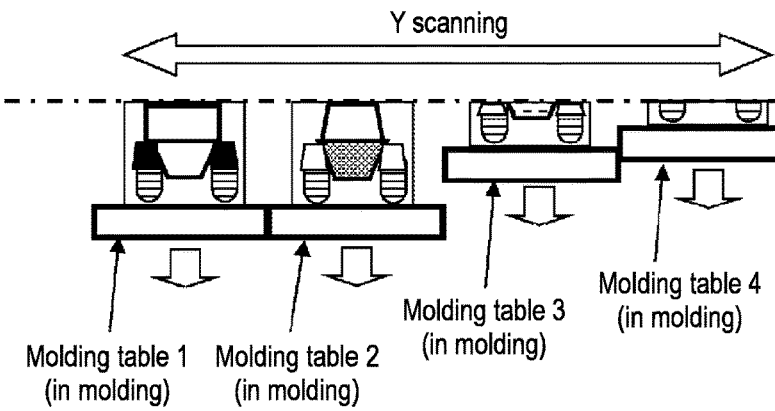

FIGS. 3 and 4 are flowcharts showing one example of a control method of controlling the operation of molding by the molding device 10, and show one example of a control carried out when simultaneously molding a plurality of molding objects 50 on a plurality of molding tables 202. The control is, for example, a control carried out by the controller 40 in the molding device 10. Furthermore, one part of the control described below may be carried out by a host PC that controls the operation of the molding device 10.

In this control, first, the molding data indicating the molding object 50 to start molding is accepted (accept new data, S102). This operation may be, for example, an operation of accepting a job (molding job) for causing the molding device 10 to carry out molding. Furthermore, this operation may be, for example, an operation of reading the molding data specified by a user (operator), and the like. When an available molding table 202 that can start new molding exists (S104: Y), a molding table 202 in which the scanning width in the main scanning operation (Y scanning) becomes a minimum is searched, the molding data for the new molding is assigned to such molding table 202, and the process proceeds to step S108. When an available molding table 202 does not exist in step S104 (S104: N), the operation of step S106 is not carried out, and the process proceeds to step S108.

In step S108, a value of a variable N for managing the number of molding tables 202 to use for molding is initialized to zero. Furthermore, after the initialization, the value of N is incremented by one (S110), and when the value of N is smaller than or equal to the number of molding tables 202 in the molding device 10 (S112: Y), slicing of molding data is carried out if the molding data is non-sliced molding data assigned to the Nth molding table 202 (S114). In this case, the non-sliced molding data is molding data in which corresponding slice data is not generated. Furthermore, when referring to carrying out the slicing of the molding data, this means generating the slice data corresponding to the molding data. Moreover, in the present example, the generated slice data is corresponded with the molding table 202 that carries out molding using the relevant slice data.

After the operation in step S114, the process is returned to step S110, and the subsequent operations are repeated. In this repetition, when the value of N sequentially becomes larger and the value of N becomes greater than the number of molding tables 202 in the molding device 10 (S112: N), the process proceeds to step S116.

In step S116, the presence/absence of the slice data is checked. When the slice data corresponded to one of the molding tables 202 exists (S116: Y), the slice result is synthesized (S118). In this case, synthesizing the slice result means, for example, synthesizing a plurality of pieces of slice data corresponded to each of the plurality of molding tables 202 to generate a new piece of slice data. Furthermore, in this case, for example, the synthesis is carried out to gather data corresponding to a portion to be formed with the main scanning operation of the same turn in the plurality of molding objects 50 to be simultaneously molded with respect to the plurality of pieces of slice data corresponded to each of the plurality of molding tables 202 to generate new piece of slice data.

After synthesizing the slice results, the operation of molding is carried out based on the slice data obtained by synthesis (S120). Thus, in the present example, when molding the plurality of molding objects 50 on the plurality of molding tables 202, the controller 40 in the molding device 10 controls the operation of molding based on the data in which the plurality of pieces of slice data corresponding to each of the plurality of molding objects 50 are synthesized.

During the operation of molding, the end of molding on each molding table 202 is monitored. In this case, first, the value of the variable N is first initialized to zero (S122), and the value of N is incremented by one (S124). When the molding on the Nth molding table 202 is completed when the value of N is smaller than or equal to the number of molding tables 202 in the molding device 10 (S116: Y), the molding object 50 is detached from the relevant molding table 202 (S128). After detaching the molding object 50, the process is returned to step S124, and the subsequent operations are repeated. In this repetition, when the value of N sequentially becomes larger and the value of N becomes greater than the number of molding tables 202 in the molding device 10 (S126: N), the process is returned to S102 to accept the next molding data (S126: N). When a state in which the slice data does not exist is obtained in step S116, the operation of molding is terminated.

According to such configuration, for example, the plurality of molding objects 50 can be simultaneously and appropriately molded using the plurality of molding tables 202. Furthermore, the plurality of molding objects 50 can be sequentially molded using the same molding table 202 by detaching the molding object 50, which molding is completed. Thus, according to the present example, a great number molding objects 50 can be efficiently and appropriately molded with the configuration using the plurality of molding tables 202.

When detaching the molding object 50, which molding is completed, during the operation of the molding device 10 as in the operation described above, at least the upper surface of each of the plurality of molding tables 202 is preferably moved to a position where the molding object 50 can be easily detached. In this case, for example, consideration is made to also be able to move, for example, at least the upper surface of each of the plurality of molding tables 202 independent from each other in the sub-scanning direction. Furthermore, in this case, for example, consideration is made to independently move each of the plurality of molding tables 202, and the like with the X scanning driver 32 (see FIGS. 1(*a*) and 1(*b*)).

More specifically, for example, when the molding of one of the molding objects 50 is completed in molding the plurality of molding objects 50 on the plurality of molding tables 202, the X scanning driver 32, for example, moves at least the upper surface of the molding table 202, on which the relevant molding object 50 is placed, in the sub-scanning direction and shifts the position of the upper surface of the relevant molding table 202 in the sub-scanning direction from the upper surface of the other molding tables 202. According to such configuration, for example, the molding object 50, which molding is completed, can be more easily and appropriately detached while carrying out molding on another molding table 202.

Next, the operation of the molding device 10 of when molding the plurality of molding objects 50 on the plurality of molding tables 202 will be described in further detail. FIGS. 5(*a*) to 6(*b*) show one example of an operation (molding procedure) of the molding device 10 of when simultaneously molding the plurality of molding objects 50.

FIG. 5(*a*) shows one example of a state in which molding is carried out using some molding tables 202. In the illustrated state, the molding device 10 carries out the molding using the molding tables 202 indicated as molding tables 1, 2 in the figure. In this case, the molding device 10 moves the molding tables 1, 2 in the layering direction (Z direction) in accordance with the advancement in molding on the molding tables 1, 2. In this state, the molding tables 202 indicated as molding tables 3, 4 are not used for molding and are standing by in a stopped state.

Furthermore, in this state, the upper surfaces of the molding tables 1, 2, which are the molding tables 202 carrying out the molding, are at positions lower than the flattening surface by a height of the molding object 50 being molded, as shown in the figure. In this case, the flattening surface is, for example, a plane at a position of a height where flattening is carried out by the flattening roller unit 106 (see FIGS. 2(*a*) to 2(*c*)). Furthermore, the upper surfaces of the molding tables 3, 4, which are the molding tables 202 in standby, are at predetermined initial positions close to the flattening surface. The initial position is, for example, an origin position of the molding table 202 in the layering direction.

FIG. 5(*b*) shows one example of a configuration of the molding object 50 being molded. As also described above, in the present example, the molding device 10 carries out the molding of the molding object 50 while forming a support layer at the periphery. In this case, the molding object 50 formed with the molding material such as the molding ink is in a state of being surrounded by the support layer, as shown in the figure, in the middle of molding.

FIG. 5(*c*) shows one example of a state in which the molding based on new molding data started. As also described above, in the present example, the molding device 10 can start the molding on another molding table 202 during the molding on some molding tables 202. Furthermore, in the illustrated state, the molding device 10 newly starts molding using the molding table 3 with the new molding data in the middle of carrying out the molding using the molding tables 1, 2.

In this case, the molding device 10 changes the scanning width of the main scanning operation (Y scanning) in accordance with the start of the new molding. More specifically, in this case, the scanning width is widened so that the head portion 12 also passes above the molding table 3. Furthermore, after the start of molding with the molding table 3, the molding device 10 further moves the molding table 3 in the layering direction (Z direction) in accordance with the advancement in molding on the molding table 3. Moreover, the positions in the layering direction of the molding tables 1 to 3 used for the molding are individually adjusted in accordance with the advancement in molding.

FIG. 5(*d*) shows one example of a state in which the molding based on new molding data further started. In the illustrated state, the molding device 10 newly starts molding using the molding table 4 with the new molding data in the middle of carrying out the molding using the molding tables 1 to 3. In this case as well, the molding device 10 changes the scanning width of the main scanning operation in accordance with the start of the new molding. More specifically, in this case, the scanning width is widened so that the head portion 12 also passes above the molding table 4. Furthermore, after the start of molding with the molding table 4, the molding device 10 further moves the molding table 4 in the layering direction in accordance with the advancement in molding on the molding table 4. Thus, the positions in the layering direction of the molding tables 1 to 4 used for the molding are individually adjusted in accordance with the advancement in molding.

As also described above, in the present example, when the molding on one of the molding tables 202 is completed, the completed molding object 50 is detached from the molding device 10. The molding device 10 starts the new molding with the molding table 202 at the relevant position, as necessary.

Figure 6A:
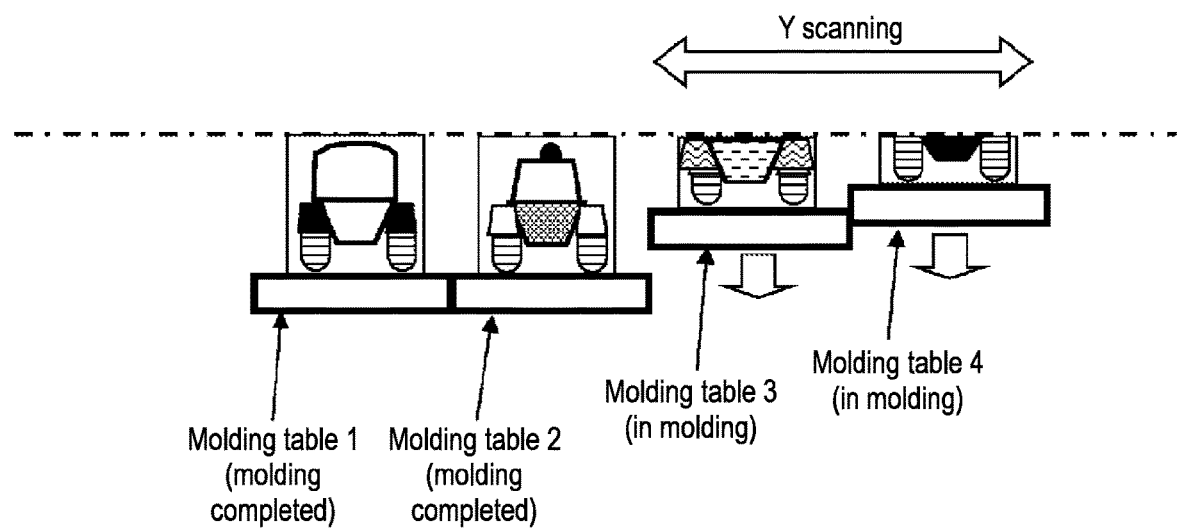
FIGS. 6(a) and 6(b) are views showing one example of a molding procedure of when simultaneously molding a plurality of molding objects 50.
Figure 6B:
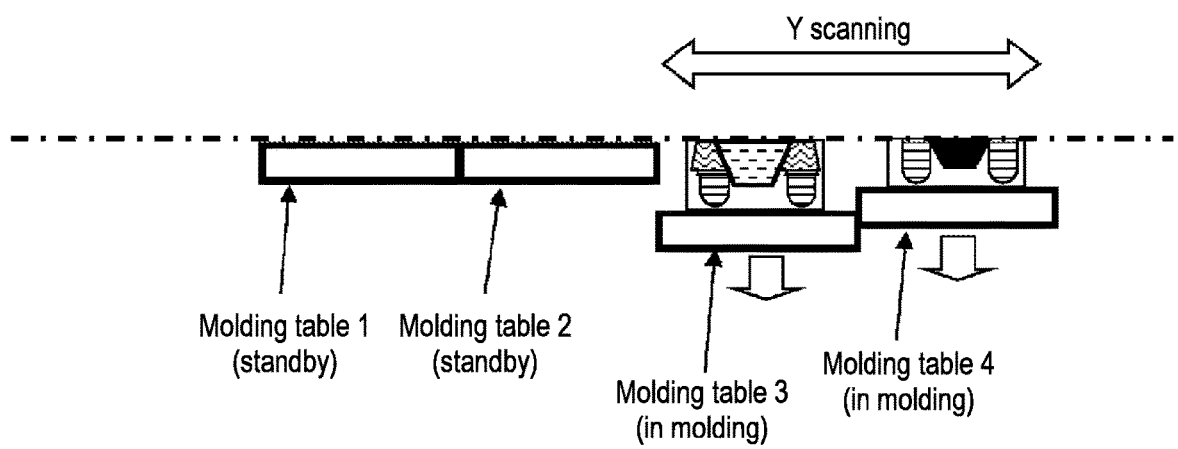

FIG. 6(*a*) shows one example of a state in which the molding is completed on some molding tables 202. The illustrated state is a state in which the molding with the molding tables 1, 2 is completed when the molding is carried out with the molding tables 1 to 4. In this case, for example, the molding tables 202 (molding tables 1, 2), on which the molding of the molding object 50 is completed, are preferably moved in the sub-scanning direction (e.g., nearside direction in the figure) so that the completed molding object 50 can be easily detached. The operation of moving the molding table 202 to enable the completed molding object 50 to be easily detached will be described later in further detail. Furthermore, in this case, it becomes unnecessary to include the positions of the molding tables 1, 2, in which the molding is completed, in the future scanning width. Thus, in the present example, the molding device 10 changes the scanning width of the main scanning operation even when the molding on some molding tables 202 is completed. More specifically, in this case, the scanning width is narrowed so that the head portion 12 passes above the molding tables 3, 4, which carry out molding in the future, and so that the scanning width becomes as narrow as possible.

Furthermore, after detaching the molding object 50, for example, the molding table 202 is moved according to the instruction of the user, and the molding table 202 is returned to the original initial position. In this case, the initial position is, for example, the standby position of the molding table 202 and the origin position of molding start in the sub-scanning direction (X direction) and the layering direction (Z direction). Furthermore, in this case, the molding operation is continued on the molding tables 3, 4 even during the operation of detaching the completed molding object 50 on the molding tables 1, 2 and during the operation of returning the molding table 202.

According to such configuration, for example, the completed molding object 50 can be appropriately detached without stopping the operation of molding by the molding device 10. Furthermore, in an alternative embodiment of the molding device 10, for example, the operation of all molding may be temporarily stopped at the time of detaching the molding object 50 on the molding tables 1, 2. For example, when using a configuration of detaching the molding object 50 without moving the molding table 202 in the sub-scanning direction, and the like, the operation of all molding is preferably temporarily stopped at the time of detaching the molding object 50 on the molding tables 1, 2. Moreover, after detaching the molding object 50, the molding table 202 is raised in the layering direction to be returned to the initial position (origin position). Thus, the molding table 202 after the molding object 50 is detached is in the standby state. The operation of temporarily stopping the molding and taking out the molding object 50 will also be described later in further detail.

FIG. 6(*b*) shows one example of a state after detaching the completed molding object 50. In the illustrated state, the molding device 10 continues the operation of molding using the molding tables 3, 4 on which the molding of the molding object 50 is not completed. In this case, the molding tables 1, 2 are in the standby state at the initial position.

As described above as well, in the present example, the molding table 202 to carry out the new molding is selected so that the scanning width of the main scanning operation becomes a minimum when starting the molding with new molding data. In this case, for example, the molding table 202 in standby adjacent to the molding table 202 in the middle of carrying out the molding can be considered for use in the molding to start next. Thus, when starting the new molding from the state shown in FIG. 6(b), the molding is started using the molding table 2.

When selecting the molding table 202 in such manner, for example, the molding table 202 is sequentially used basically in the order of molding tables 1, 2, 3, 4, 1, 2, ... when molding only the molding objects 50 in which the time required for molding is the same. However, at the time of the actual molding, the timing the molding is completed differs as the size (Z direction dimension), and the like differ in the shape of the molding object 50. Thus, the order to use the molding table 202 normally does not become such a simple order (cyclic). Thus, when continuously carrying out molding as in the present example, the molding table 202 is preferably selected so that the scanning width in the main scanning direction (Y direction) becomes a minimum, as described above, in the selection of the molding table 202 based on the new molding data.

According to the present example, for example, the molding using the plurality of molding tables 202 can be appropriately carried out by the above operations. Thus, for example, continuous operation, automatic operation, and the like by the molding device 10 can be carried out, and a great number of molding objects 50 can be efficiently and appropriately molded. In FIGS. 5(a) to 6(b), a case of molding one molding object 50 with respect to one molding table 202 has been illustrated for the sake of convenience of illustration, and the like. However, at the time of the actual molding, for example, a plurality of different molding objects 50 may be molded on one molding table 202.

Figure 7A:
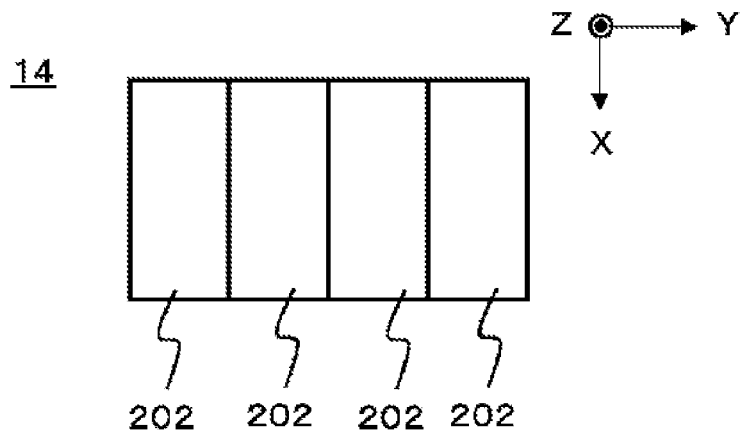
FIGS. 7(a) to 7(c) are views describing an alternative embodiment of a configuration of the molding object supporter 14 in the molding device 10.
Figure 7B:
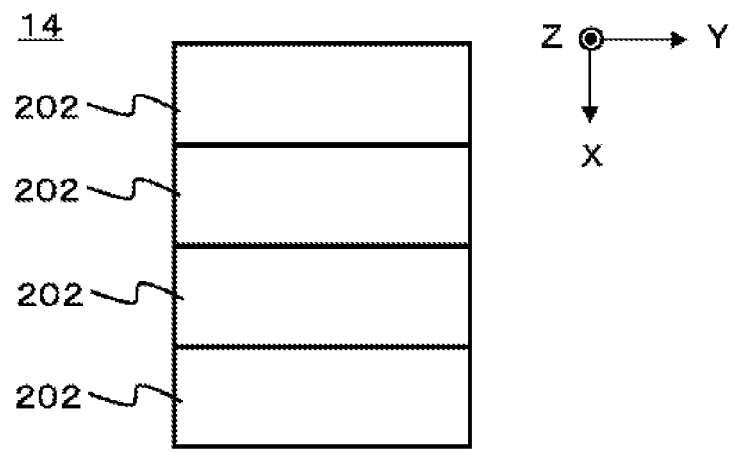
Figure 7C:
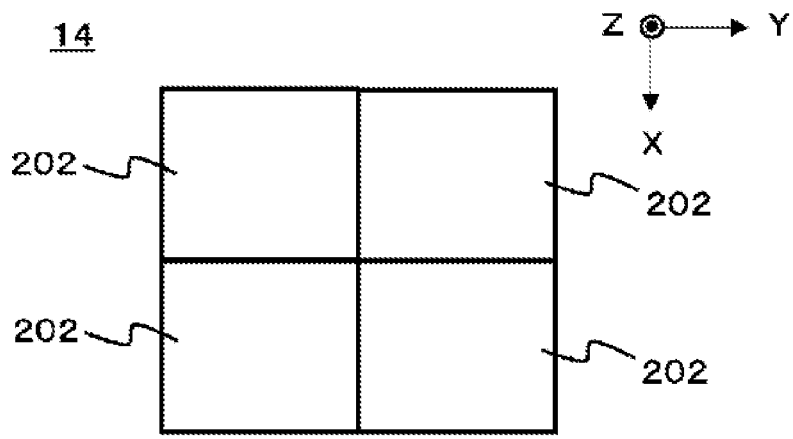

Next, an alternative embodiment, and the like of the configuration of the molding device 10 will be described. FIGS. 7(a) to 7(c) are views describing an alternative embodiment of the configuration of the molding object supporter 14 in the molding device 10. Other than the points described below, in FIGS. 7(a) to 7(c), the configuration denoted with the same reference numeral as FIGS. 1(a) to 6(b) may have a feature same as or similar to the configuration in FIGS. 1(a) to 6(b).

FIG. 7(a) shows a configuration of the molding object supporter 14 in the case illustrated in FIGS. 1(a) and 1(b) in a simplified manner. As also described above, in this case, the molding object supporter 14 includes a plurality of molding tables 202 lined in the main scanning direction (Y direction). More specifically, in the illustrated case, the molding object supporter 14 includes four molding tables 202. Furthermore, the molding object supporter 14 thus has a configuration of being divided into four in the main scanning direction.

However, the manner of arranging the plurality of molding tables 202 in the molding object supporter 14 is not limited to the manner shown in FIG. 7(a) and can be variously changed. For example, the number of molding tables 202 to arrange is not limited to a specific number, and can be variously changed. Furthermore, the direction of arranging the plurality of molding tables 202 also can be variously changed. More specifically, consideration is made to arrange the plurality of molding tables 202 on one of or both sides of the main scanning direction and the sub-scanning direction (X direction). Furthermore, in FIG. 7(a), a case in which the size (dimension) and the shape of the plurality of molding tables 202 are the same (equal) is illustrated. However, the size and the shape of the plurality of molding tables 202 may not be the same.

FIG. 7(b) shows an alternative embodiment of the configuration of the molding object supporter 14. In this case, the molding object supporter 14 includes a plurality of molding tables 202 lined in the sub-scanning direction. More specifically, in the illustrated case, the molding object supporter 14 includes four molding tables 202. The molding object supporter 14 thus has a configuration of being divided into four in the sub-scanning direction. In this case as well, the Z scanning driver 36 (see FIGS. 1(a) and 1(b)) individually moves each molding table 202 in the layering direction (Z direction).

When using the molding object supporter 14 shown in FIG. 7(b), the head portion 12 may not pass above all the molding tables 202 and may pass above only some molding tables 202 in each main scanning operation. More specifically, in each main scanning operation, the head portion 12 may eject the ink onto only one molding table 202. In this case, instead of simultaneously molding the plurality of molding objects 50, for example, the plurality of molding tables 202 may be molded in order one by one while sequentially changing the molding table 202 to carry out molding by, for example, relatively moving the plurality of moving tables 202 in the sub-scanning direction with respect to the head portion 12. Even in such a case, the plurality of molding objects 50 can be appropriately molded by using a configuration of individually moving the molding table 202 in the layering direction.

In this case as well, for example, the ink may be ejected onto the plurality of molding tables 202 by the head portion 12 in each main scanning operation using the head portion 12 which length in the sub-scanning direction is greater than or equal to the width of the plurality of molding tables 202 combined. According to such configuration, for example, the plurality of molding objects 50 can be simultaneously molded.

FIG. 7(c) shows another alternative embodiment of the configuration of the molding object supporter 14. In this case, the molding object supporter 14 includes a plurality of molding tables 202 respectively lined in the main scanning direction and the sub-scanning direction. More specifically, in the illustrated case, the molding object supporter 14 includes four molding tables 202 lined in the main scanning direction and the sub-scanning direction by twos. Thus, the molding object supporter 14 has a configuration of being divided into four in the main scanning direction and the sub-scanning direction.

In this case as well, the plurality of molding objects 50 can be appropriately molded by using a configuration of individually molding the molding table 202 in the layering direction. Furthermore, for example, the plurality of molding objects 50 can be simultaneously molded using the plurality of molding tables 202 lined in the main scanning direction.

Figure 8A:
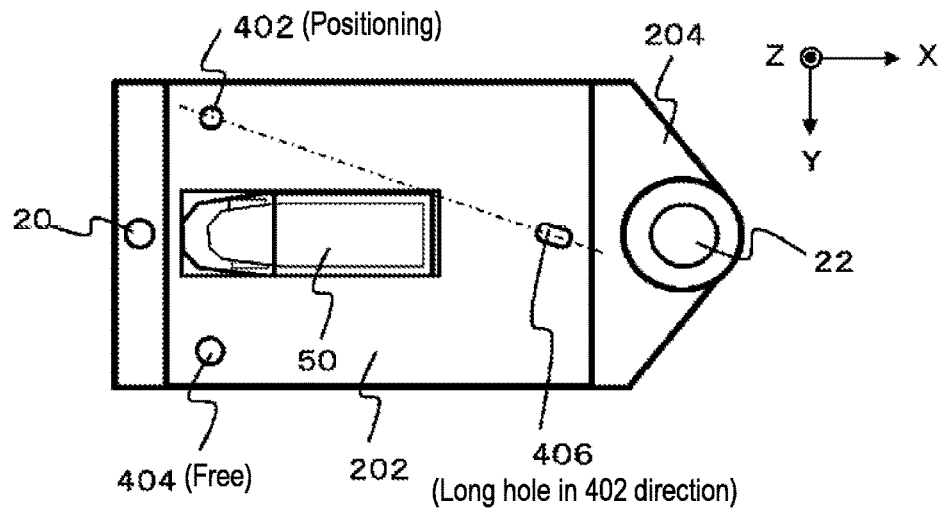
FIGS. 8(a) to 8(c) are views showing an alternative embodiment of the configuration of the molding object supporter 14.
Figure 8B:
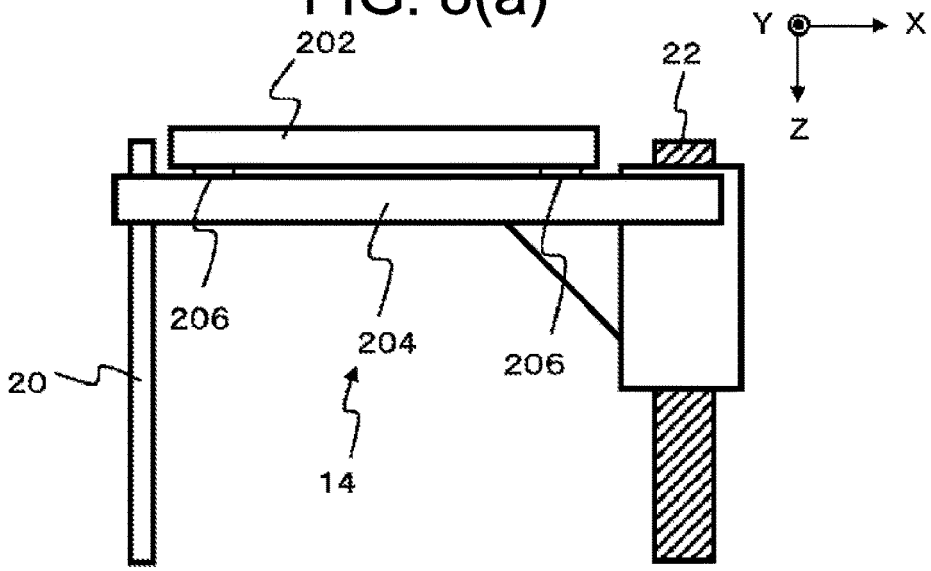
Figure 8C:
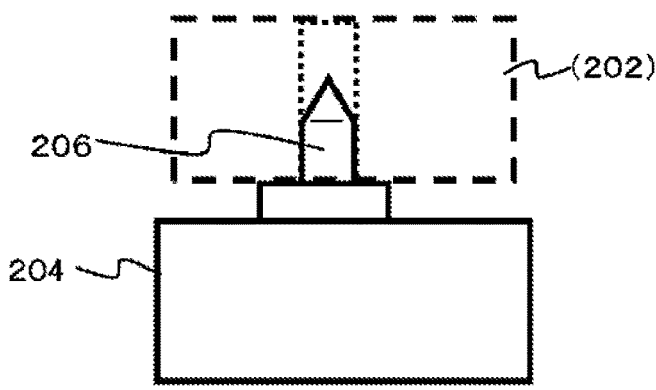

A specific configuration of the molding object supporter 14 can be variously changed. FIGS. 8(a) to 8(c) show an alternative embodiment of the configuration of the molding object supporter 14. Other than the points described below, in FIGS. 8(a) to 8(c), the configuration denoted with the same reference number as FIGS. 1(a) to 7(c) may have a feature same as or similar to the configuration in FIGS. 1(a) to 7(c).

FIG. 8(a) is a top view showing one example of a configuration of a molding table 202 in the present alternative embodiment. FIG. 8(b) shows one example of the configuration of the molding object supporter 14 in a state the molding table 202 is installed. FIG. 8(c) shows one example of a configuration of a positioning step pin 206 used for the positioning of the molding table 202.

In the present alternative embodiment, each of the plurality of molding tables 202 is configured to be separately detachable independent from the other molding tables 202. More specifically, in the present alternative embodiment, the molding object supporter 14 includes a driving table 204, the plurality of molding tables 202, and a plurality of positioning step pins 206. The driving table 204 is a table-shaped member where the molding table 202 is attached at the time of molding. In the present alternative embodiment, the driving table 204 is configured such that a region where each of the plurality of molding tables 202 is attached is movable in the layering direction independent from each other, where the molding table 202 is individually moved in the layering direction by moving each region in the layering direction with the molding table 202 installed. Furthermore, each region where the molding table 202 is attached in the driving table 204 is moved in the layering direction along the Z scanning guide 20 according to a driving force of the scanning driver 36 (see FIGS. 1(a) and 1(b)) received through the Z scanning shaft 22 by, for example, a configuration same as or similar to the molding table 202 of the configuration shown in FIGS. 1(a) and 1(b).

Furthermore, the molding table 202 includes a plurality of holes 402, 404, 406 for positioning, and is attached to the driving table 204 in accordance with the position of the positioning step pin 206 installed on the driving table 204. In this case, the plurality of holes 402, 404, 406 are an example of a reference part for positioning of the molding table 202. Furthermore, the hole 402 of the plurality of holes 402, 404, 406 is a reference hole of positioning. For example, a circular hole, and the like to which the pin of the positioning step pin 206 is fitted with a precision sufficient for positioning can be suitably used for the hole 402. Furthermore, the hole 406 is a long hole for determining the position of the molding table 202 with the hole 402. For example, a long hole in which a width in a direction parallel to a straight line connecting the center of the hole 402 and the center of the hole 406 is longer than a diameter of the pin of the positioning step pin 206 can be suitably used for the hole 406. Furthermore, in this case, the width of the hole 406 in the direction orthogonal to such straight line is preferably a width that makes contact with the pin of the positioning step pin 206 at a precision sufficient for positioning. The hole 404 is a hole (free hole) used to assist the positioning, and the like.

The positioning step pin 206 is a pin member used for the positioning of the molding table 202 on the driving table 204. The positioning step pin 206 defines the position of the molding table 202 to be attached to the driving table 204 by being installed at a predetermined position on the driving table 204.

The number of locations to carry out positioning using the positioning step pin 206 is preferably three, as shown in FIGS. 8(a) to 8(c). This is because if the positioning is carried out at four or more locations, for example, one or more locations may float and the horizontal property of the molding table 202 easily becomes unstable. Furthermore, if the horizontal property of the molding table 202 becomes unstable, molding defect may occur. If the number of locations to carry out positioning is two or less, the horizontal property of the molding table 202 may not be appropriately adjusted. If the positioning is carried out at three locations, on the other hand, stability is obtained not only in the X and Y directions but also in the Z direction by its own weight. Furthermore, the detachment and attachment of the molding table 202 thus can be easily and appropriately carried out.

In the present alternative embodiment, the positioning step pin 206 includes a pin to be inserted to the hole (hole 402, etc.) of the molding table 202, and a step part that supports a lower surface of the molding table 202, as shown in, for example, FIG. 8(c). According to such configuration, for example, the molding table 202 can be appropriately installed on the driving table 204 at high precision. Furthermore, the molding table 202 can be easily and appropriately detached, as necessary.

Furthermore, in the present alternative embodiment, for example, the molding object 50 can be detached with the molding table 202 when detaching the molding object 50, which molding is completed, from the molding device 10, and the like. More specifically, in this case, for example, consideration is made to move the molding table 202 on which the molding object 50, which molding is completed, is mounted in the sub-scanning direction and detaching the molding object 50 for every molding table 202 by the user, and the like in the middle of carrying out the molding of another molding object 50 on another molding table 202. When configured in such manner, for example, the operation of detaching the molding object 50 from the molding table 202 can be more easily carried out compared to, for example, when detaching the molding object 50 from the molding table 202 in a state installed in the molding device 10. In this case, consideration is made to install, after the molding object 50 is detached from the molding table 202, the molding table 202 again at the original position. According to such configuration, the plurality of molding objects 50 can be appropriately molded continuously without stopping the molding operation of the molding device 10.

After detaching the molding table 202, for example, instead of immediately detaching the molding object 50 from the molding table 202, the molding object 50 may be subsequently detached from the molding table 202. In this case, a new different molding table 202 is preferably installed with respect to the original position of the molding table 202. Even when configured in such manner, the plurality of molding objects 50 can be appropriately molded continuously without stopping the molding operation of the molding device 10. When configured in such manner, for example, the molding object 50 can be more appropriately detached over time even if the molding object 50 is strongly adhered to the molding table 202.

Figure 9A:
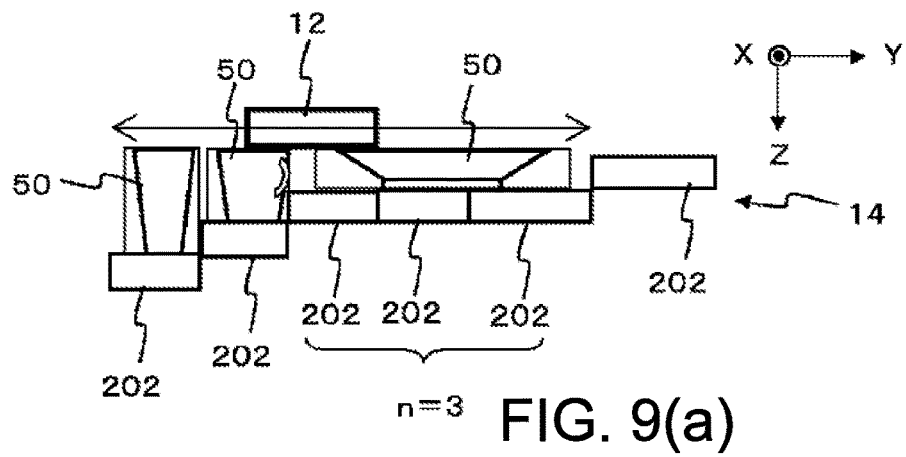
FIGS. 9(a) to 9(c) are views showing a further alternative embodiment of the configuration of the molding object supporter 14 and an alternative embodiment of the configuration of the molding device 10.
Figure 9B:
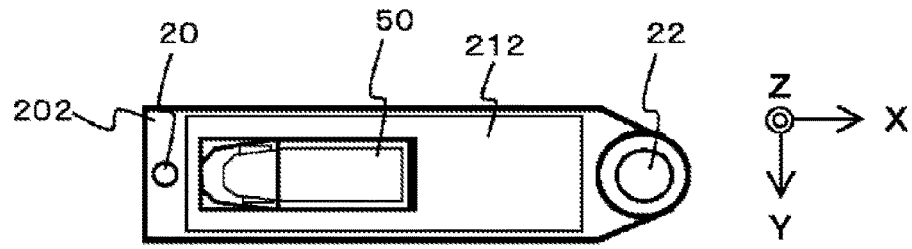
Figure 9C:
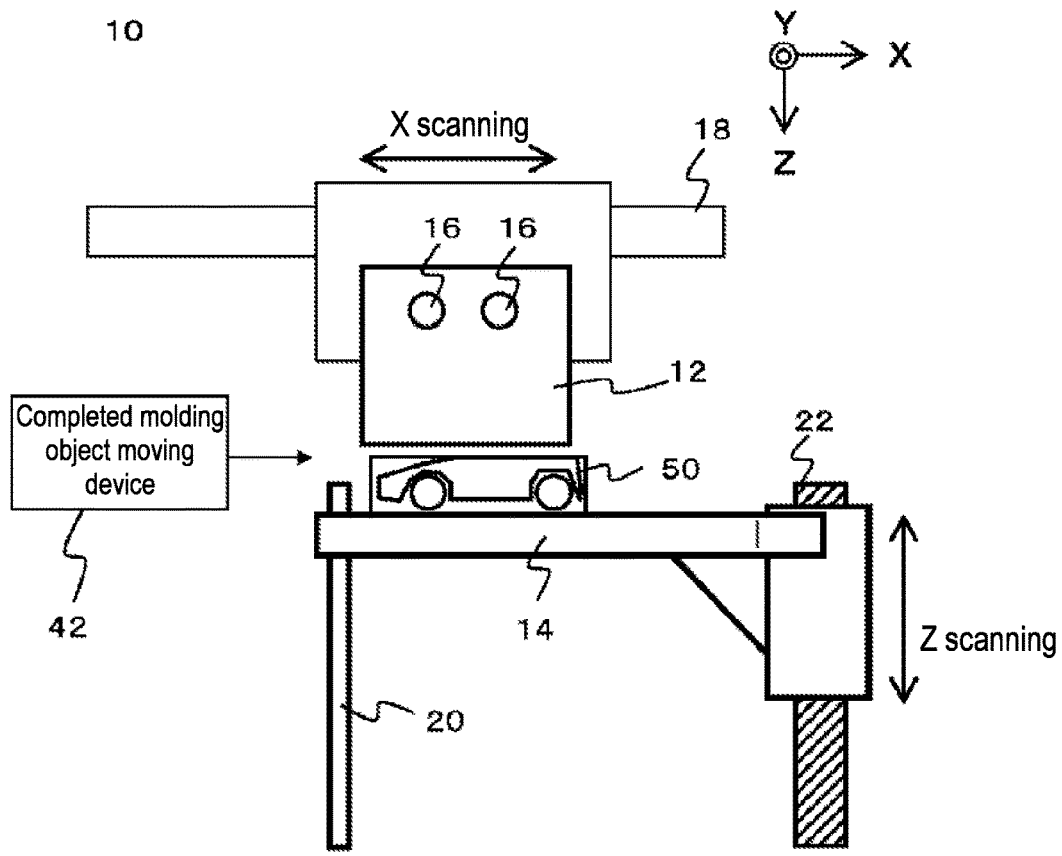

FIGS. 9(a) to 9(c) show a further alternative embodiment of the configuration of the molding object supporter 14 and an alternative embodiment of the configuration of the molding device 10. Other than the points described below, in FIGS. 9(a) to 9(c), the configuration denoted with the same reference numerals as FIGS. 1(a) to 8(c) may have a feature same as or similar to the configuration in FIGS. 1(a) to 8(c).

FIG. 9(a) shows a further alternative embodiment of the configuration of the molding object supporter 14. As described above, the size and shape of the plurality of molding tables 202 in the molding object supporter 14 may not be the same. In this case, for example, consideration is made to use a plurality of molding tables 202 in which the size of at least the upper surface is different from each other. More specifically, in the case of the configuration shown in FIG. 9(a), a molding table 202 having a different size (area) from the other molding table 202 is used for at least some molding tables 202. According to such configuration, for example, the molding table 202 corresponding to the size of the molding object 50 to mold can be more appropriately used. In this case, the molding tables 202 having different sizes are preferably used according to purpose according to the molding data. Furthermore, according to such configuration, for example, more molding tables 202 can be lined in the same width compared to when the size of all the molding tables 202 is increased according to the maximum size of the moldable molding object 50.

Furthermore, when attempting to mold a large molding object 50, consideration is made to mold one molding object 50 on the plurality of molding tables 202. In this case, a molding object 50 having a size (e.g., n times) of n molding tables 202 in the main scanning direction can be molded by Z scanning a plurality of (n) molding tables 202 in synchronization.

More specifically, in FIG. 9(a), an example of when molding one molding object on three (n=3) molding tables 202 having different sizes in the Y direction is shown. In this case, the Z scanning driver 36 (see FIGS. 1(a) and 1(b)) moves the molding tables 202 in synchronization with the positions in the layering direction (Z direction) aligned, as shown in the figure. According to such configuration, for example, one molding object 50 can be appropriately molded on the plurality of molding tables 202. In this case, the gap between the adjacent molding tables 202 is preferably made sufficiently small so as not to influence the precision of molding.

As in the case shown in FIGS. 7(b), 7(c), for example, one molding object 50 may be molded on the plurality of molding tables 202 even when using the molding tables 202 lined in the sub-scanning direction. In this case, for example, a large molding object 50 which size in the sub-scanning direction is larger than one molding table 202 can be molded.

The above described operation of molding one molding object 50 on three molding tables 202 is an example of an operation of molding at least one molding object 50 on the plurality of molding tables 202. Furthermore, in this case, when referring to molding at least one molding object 50 on the plurality of molding tables 202, this means, for example, carrying out molding of at least one molding object 50 while being mounted on the plurality of molding tables 202. Furthermore, in this case, focusing on such one molding object 50, the operation can be considered as an operation of molding one molding object 50 on the plurality of molding tables 202. In this case, in addition to such one molding object 50, another molding object 50 may be simultaneously molded on one of the molding tables 202.

In a further alternative embodiment of the configuration of the molding object supporter 14, consideration is made to change the manner of using the molding table 202. FIG. 9(b) shows an alternative embodiment of changing the manner of using the molding table 202.

In the description made above, a configuration using the molding tables 202 that can be detached independent from each other has been described using FIG. 8 FIGS. 8(a) to 8(c) and the like. However, considering from the standpoint of facilitating the detachment of the molding object 50, other further methods can be considered. More specifically, in the case of the configuration shown in FIG. 9(b), a tray 212 of a different body from the molding table 202 is installed on the upper surface of the molding table 202. In this case, the tray 212 is a flat plate-shaped member, for example, and is fixed on the molding table 202 by its own weight. One part of the tray 212 may be a plate-shaped member. The head portion 12 (see FIGS. 1(a) and 1(b)) ejects the ink toward the tray 212 to mold the molding object 50 on the molding table 202 where the tray 212 is installed.

Furthermore, in this case, the tray 212 is, for example, installed on the molding table 202 in a detachable manner, and is detached with the molding object 50 after the completion of molding. Even when configured in such manner, the completed molding object 50 can be more easily and appropriately detached.

Furthermore, in this case, a state in which new molding can be started is obtained by installing a new tray 212 on the molding table 202 of after the molding object 50 and the tray 212 are detached. Furthermore, at the time of the operation of molding, the control of the position of the head portion 12 is, for example, carried out by the control of the relative position with respect to the molding table 202. Thus, even if the position of the tray 212 to be installed on the molding table 202 is shifted to a certain extent, for example, the precision of molding is not influenced. Thus, when using the tray 212, the effort in position alignment, and the like at the time of installing can be reduced compared to, for example, when configuring the molding table 202 itself to be detachable. Thus, for example, the plurality of molding objects 50 can be more efficiently molded.

When carrying out molding using the molding table 202 and the tray 212, a problem of lowering in flatness may occur by warp originating from the material of the molding table 202, the tray 212, and the like, deformation by detachment, and the like. Thus, when using the molding table 202 and the tray 212, a support layer to become a base of the molding object 50 is preferably formed on the molding table 202 or the tray 212, and then the molding object 50 is preferably molded thereon. In this case, the thickness of the support layer to become the base is preferably greater than or equal to the thickness that can be flattened by the flattening roller unit 106 (see FIGS. 2(a) to 2(c)) in at least the head portion 12. According to such configuration, for example, even if the flatness of the molding table 202 and the tray 212 is low, the support layer to become the base can be appropriately flattened. Furthermore, the molding object 50 can be appropriately molded with higher precision.

FIG. 9(c) shows a further alternative embodiment of the configuration of the molding device 10. As described above, when continuously operating the molding device 10 and molding a great number of molding objects 50, at the time point the molding of the molding object 50 is completed on one of the molding tables 202, the relevant molding object 50 needs to be detached and a state in which new molding can be carried out with the molding table 202 at the relevant position needs to be obtained. In this case, consideration is made to have the user of the molding device 10, for example, carry out the detachment of the molding object 50.

However, consideration is also made to automatically carry out the detachment of the completed molding object 50 using a device. For example, in the configuration shown in FIG. 9(c), the molding device 10 further includes a completed molding object moving device 42. The completed molding object moving device 42 is an example of a completed molding object mover, and detaches the molding object 50, which molding is completed, from the position of the molding table 202 and moves the completed molding object 50.

For example, consideration is made to use a known robot device, a transport device, and the like for the completed molding object moving device 42. In this case, the completed molding object moving device 42, for example, detaches the molding object 50 with the molding table 202. According to such configuration, for example, the molding object 50 can be appropriately prevented from being broken at the time of detachment, and the like. Furthermore, for example, when installing the tray 212 on the molding table 202, the completed molding object moving device 42 may detach the molding object 50 with the tray 212.

When detaching the molding table 202 or the tray 212 with the completed molding object moving device 42, the completed molding object moving device 42, for example, installs a new molding table 202 or a tray 212 to the detached position. According to such configuration, the new molding can be appropriately started at the relevant position. Furthermore, the plurality of molding objects 50 can be more appropriately molded by the continuous operation of the molding device 10.

The completed molding object moving device 42 moves the detached molding object 50 to a storage position set in advance. Furthermore, when detaching the molding object 50 with the molding table 202 or the tray 212, the molding object 50 is to be moved to the storage position with the molding table 202 or the tray 212. In this case, the completed molding object moving device 42, for example, newly installs a molding table 202 or a tray 212 different from the detached molding table or tray. Furthermore, the completed molding object moving device 42 may automatically detach the molding object 50 from the molding table 202 or the tray 212, and return the same molding table 202 or the tray 212 to the original position.

Figure 10A:
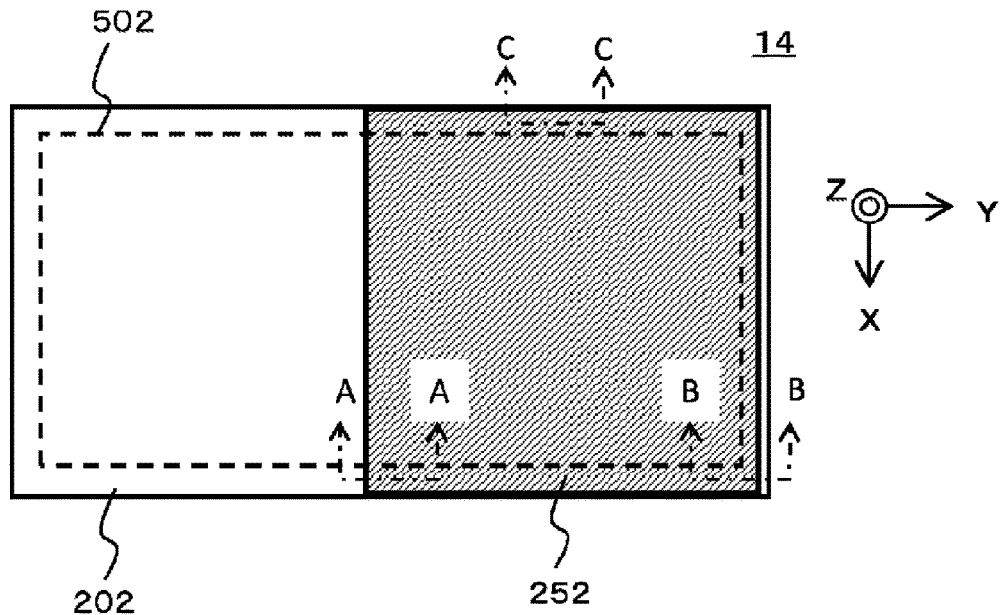
FIGS. 10(a) and 10(b) are views showing an alternative embodiment of the configuration of the molding object supporter 14.
Figure 10B:
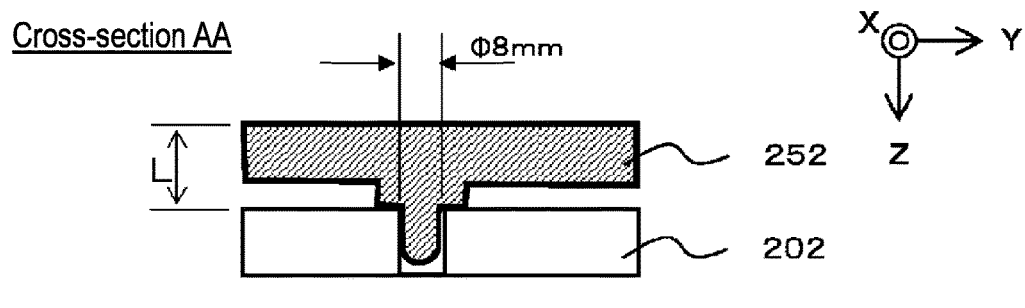
Figure 10B:
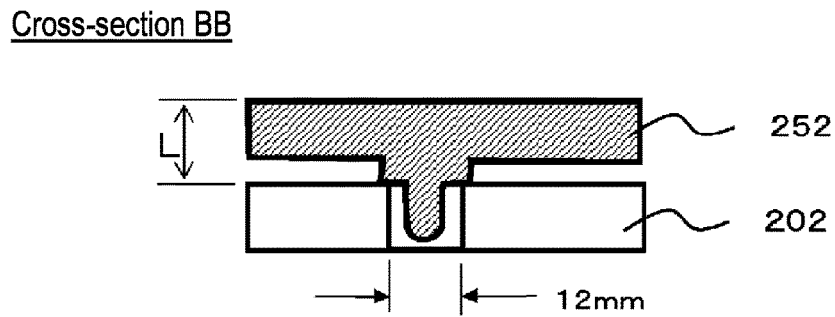
Figure 10B:
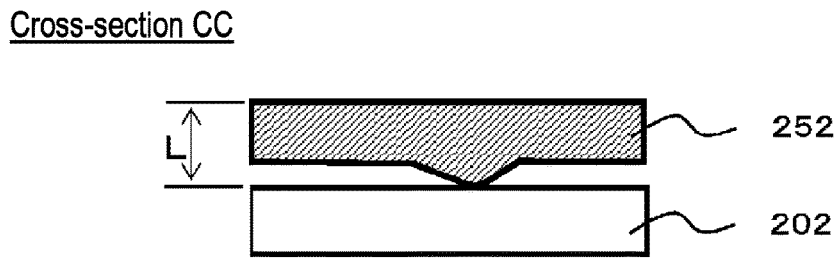

As described below, for example, a further alternative embodiment, and the like can be considered for the configuration of the molding object supporter 14, the operation of the molding device 10, and the like. FIGS. 10(a) and 10(b) show an alternative embodiment of the configuration of the molding object supporter 14. FIG. 10(a) is a top view showing one example of the configuration of the molding object supporter 14. FIG. 10(b) is a cross-sectional view of the molding object supporter 14 at positions AA, BB, CC shown with a chain dashed line in FIG. 10(a). Other than the points described below, in FIGS. 10(a) and 10(b), the configuration denoted with the same reference number as FIGS. 1(a) to 9(c) have a feature same as or similar to the configuration in FIGS. 1(a) to 9(c).

In the description made above, a configuration of when the molding object supporter 14 includes a plurality of molding tables 202 has been mainly described for the configuration for carrying out an additional molding of starting the molding of a new molding object (another molding object) in the middle of the molding of the molding object, which molding started first. In this case, as described above, the position of each molding table 202 is differed in accordance with the difference in the timing to start the molding of each molding object by moving each of the plurality of molding tables 202 in the layering direction independent from each other. Furthermore, for example, after the molding of at least one molding object is started, the molding of another molding object is started before the molding of the former molding object is completed.

However, for the configuration for carrying out the additional molding, consideration is also made to start the molding of a new molding object in the middle of the molding of the molding object, which molding started first, using one molding table 202 rather than necessarily using the plurality of molding tables 202. In this case, for example, as shown in the figure, consideration is made to install an additional molding table 252, which is a table-shaped member having a height corresponding to the difference in the timing to start the molding, on the molding table 202, and mold the new molding object on the additional molding table 252.

More specifically, in this case, the molding object supporter 14 includes one molding table 202. Furthermore, in this case as well, the molding table 202 is one example of a table portion having an opposing surface facing the head portion 12 (see FIGS. 1(a) and 1(b)). Moreover, a large molding table 202 capable of molding a plurality of molding objects 50 in a line on the opposing surface is used for the molding table 202. When referring to the plurality of molding objects being able to be molded in a line on the opposing surface, this means that for example, a plurality of molding objects can be molded in a line in an effective molding area 502, which is a range in which the molding object can be molded on the molding table 202.

Furthermore, in this case, the additional molding table 252 is a table-shaped member of a different body from the molding table 202, and is installed on the molding table 202 as necessary. More specifically, when carrying out the additional molding, the additional molding table 252 is not installed on the molding table 202 at a timing to start the molding of a first molding object. Thus, the head portion 12 molds the first molding object on the molding table 202. Furthermore, when carrying out the additional molding, after the molding of the first molding object is started, the molding of another molding object (next molding object) is started at a predetermined timing. In this case, for example, the additional molding table 252 is installed on the molding table 202 before starting the molding of another molding object. The head portion 12 thus molds another molding object on the additional molding table 252.

When configured in such manner, for example, even if the distance of the opposing surface of the molding table 202 and the head portion 12 is separated at the timing to start the molding of another molding object, the distance between a surface (upper surface of the additional molding table 252) for supporting the molding object during the molding and the head portion 12 can be sufficiently made small by installing the additional molding table 252 on the molding table 202. Furthermore, after the start of molding of another molding object, the molding of another molding object is carried out in addition to the molding object which molding started first, and the like so that the molding of a plurality of molding objects can be simultaneously carried out in parallel. In this case, when referring to simultaneously carrying out the molding of the plurality of molding objects in parallel, this means, for example, simultaneously carrying out the molding in parallel until the molding of at least one of the plurality of molding objects is completed after the start of the molding of another molding object.

Thus, in the present alternative embodiment as well, for example, the molding can be started at timing different from each other for each of the plurality of molding objects. Thus, for example, the additional molding can be appropriately carried out without using the plurality of molding tables 202. Furthermore, for example, the molding of the plurality of molding objects can be more efficiently carried out by enabling the additional molding.

Consideration is made here to use a table made from the same material as the molding table 202, for example, for the additional molding table 252. In this case, with respect to the additional molding table 252, the same material as the molding table 202 means, for example, that the material of the region where the molding object is formed in the upper surface of the additional molding table 252 is the same as the material of the effective molding area 502 in the opposing surface of the molding table 202. More specifically, for example, a table in which at least the upper surface is made from alumite can be suitably used for the additional molding table 252.

Furthermore, a table installed on the molding table 202 in three point support, as shown in each cross-section of FIG. 10(b), for example, can be suitably used for the additional molding table 252. According to such configuration, for example, the additional molding table 252 can be appropriately fixed on the molding table 202 by its own weight while appropriately suppressing the floating and the like on the molding table 202 and facilitating the detachment of the additional molding table 252.

Furthermore, in this case, the additional molding table 252 includes three protrusions on a surface on the side facing the molding table 202 at the time of installing to carry out fixing in three point support. Moreover, the molding table 202 includes a hole corresponding to one part of the three protrusions on the opposing surface. In this case, as apparent from the position of each cross-section shown in the figure, the position to carry out the three point support is set near an outer peripheral part of the molding table 202. The effective molding area 502 is set on an inner side than the position to carry out the three point support.

More specifically, in this case, consideration is made to use a protrusion inserted to the hole of the molding table 202 so that the position in each direction of the sub-scanning direction (X direction), the main scanning direction (Y direction), and the layering direction (Z direction) is determined, as shown in the cross-section AA, for example, for one of the protrusions for three point support in the additional molding table 252. In this case, when referring to the position of the protrusion being determined, this means, for example, that the position of the protrusion is determined at a sufficient precision corresponding to the resolution of molding.

Furthermore, a pin-like protrusion, and the like having a circular cross-section, for example, can be suitably used for the protrusion. Moreover, a circular hole, and the like in a relationship of clearance fit with respect to the protrusion can be suitably used for the hole corresponding to the relevant protrusion. Moreover, the diameter of the protrusion and the hole can be assumed to be, for example, about 8 mm (about Φ8 mm). In this case, as shown in the figure, the protrusion has the root portion formed greater than the diameter of the hole so that the position of the additional molding table 252 in the layering direction is also determined by inserting the protrusion into the hole. According to such configuration, the protrusion can be used as a protrusion for determining the position in each direction of the sub-scanning direction, the main scanning direction, and the layering direction.

Furthermore, consideration is made to use a protrusion inserted to the hole of the molding table 202 with margin in the movement in one of the directions parallel to the opposing surface, as shown in the cross-section BB, for example, for another one of the protrusions for three point support. In this case, for example, a pin-like protrusion, and the like having a shape same as or similar to the protrusion shown in the cross-section AA can be suitably used for the relevant protrusion. Furthermore, for example, a long hole in a relationship of clearance fit with respect to the protrusion and in which a diameter in one of the directions is larger than the diameter of the protrusion can be suitably used for the hole corresponding to such protrusion. In this case, for example, consideration is made to use a long hole in which the diameter in the sub-scanning direction is equal to the diameter of the protrusion and the diameter in the main scanning direction is greater than the diameter of the protrusion. According to such configuration, for example, the protrusion can be used as a protrusion for determining the position in each direction of the sub-scanning direction and the layering direction. Furthermore, for example, when using a protrusion in which the diameter having the same shape as the protrusion shown in the cross-section AA is about 8 mm, for example, consideration is made to use a long hole (long hole of about Φ8 mm×12 mm) in which the diameter in the main scanning direction is about 12 mm and the diameter in the sub-scanning direction is about 12 mm, for example, for the corresponding hole.

Furthermore, consideration is made to use a protrusion that is not inserted to the hole of the molding table 202, as shown in the cross-section CC, for example, for the one remaining protrusion of the protrusions for three point support. In this case, a pin-like protrusion (tip pointed pin) in which the tip is pointed, and the like can be suitably used for the protrusion. Thus, the protrusion can be used as a protrusion for determining the position in the layering direction. Consideration is made to use, for example, a tip pointed pin having a diameter of about 5 mm (about Φ5 mm), and the like for the protrusion. According to such configuration, for example, the additional molding table 252 can be appropriately installed with high precision on the molding table 202. The additional molding on the additional molding table 252 thus can be more appropriately carried out.

In a state the additional molding table 252 is installed on the molding table 202, a height L of the additional molding table 252 on the molding table 202 becomes a difference (difference in positions in the layering direction) of a starting position (molding start position) of molding of the molding object to be molded on the molding table 202 and the molding object to be molded on the additional molding table 252. Thus, an additional molding table 252 having a height L corresponding to the timing to start the molding needs to be used for the additional molding table 252.

Furthermore, consideration is made to prepare in advance, for example, a plurality of types of additional molding tables 252 having different height L from each other for the additional molding table 252. In this case, for example, a plurality of timing can be selected as the timing (molding start position) to start the molding of another molding object by using the additional molding table 252 selected according to the timing to carry out the additional molding. Thus, according to such configuration, for example, the degree of freedom in the manner of carrying out the additional molding can be further enhanced. More specifically, for example, when a maximum dimension (maximum molding dimension) in the layering direction is about 20 cm for the molding object that can be molded on the molding table 202, the additional molding tables 252 having various heights L such as L=2.5 cm, 5 cm, 7.5 cm, 10 cm, 12.5 cm and the like are preferably prepared.

In a further alternative embodiment of the configuration of the molding object supporter 14, consideration is also made to change the size and the number of additional molding tables 252. More specifically, in FIGS. 10(a) and 10(b), one example of a configuration of the molding object supporter 14 is illustrated for a case of installing only one additional molding table 252 having a size of about a half of the molding table 202 on the molding table 202. However, the size, the number, and the like of the additional molding table 252 to install on the molding table 202 may be variously changed. Furthermore, in this case, the protrusion used for the positioning of each additional molding table 252 and the hole formed in the molding table 202 are preferably appropriately changed. For example, consideration is made to use a plurality of additional molding tables 252 on the molding table 202 in an overlapping manner by changing the configuration for fixing the additional molding table 252, and the like as necessary. According to such configuration, for example, the timing to start the molding in the additional molding can be variously set.

Next, an operation of the additional molding carried out using the additional molding table 252 will be described in further detail. FIGS. 11(a) to 11(d) are views describing the operation of additional molding in further detail. Other than the points described above, in FIGS. 11(a) to 11(d), a configuration denoted with the same reference numeral as FIGS. 1(a) to 10(b) may have a feature same as or similar to the configurations in FIGS. 1(a) to 10(b).

Figure 11A:
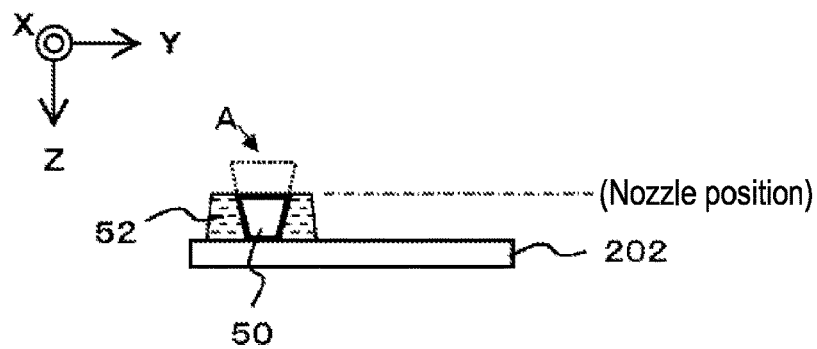
FIGS. 11(a) to 11(d) are views describing the operation of additional molding in further detail.
Figure 11B:
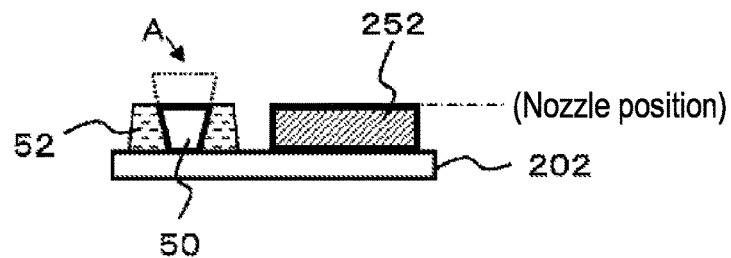
Figure 11C:
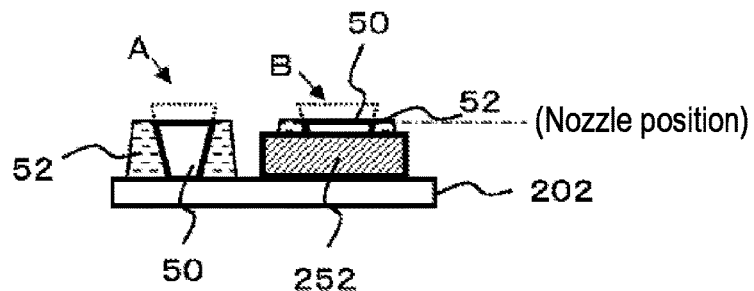

FIGS. 11(a) to 11(c) are views showing a state of the molding object 50, and the like being molded, and schematically show one example of a state of the molding object 50 and the like at timing different from each other when carrying out the additional molding. FIG. 11(a) is a view showing a state of molding the molding object 50 indicated with a reference numeral A in the figure on the molding table 202. In the figure, the nozzle position indicates a position corresponding to the nozzle that ejects the material of molding in the head portion 12 (see FIGS. 1(a) and 1(b)). In this case, the position corresponding to the nozzle is, for example, the position (position in the layering direction) of the surface to be molded of the molding object 50 set according to the position of the nozzle. At the time of the molding of the molding object 50, a support layer 52 is formed, as necessary, at the periphery of the molding object 50, as shown in the figure.

More specifically, FIG. 11(a) shows a state in which the molding object 50 denoted with the reference numeral A is molded partway at timing immediately before starting the molding of another molding object 50 to be additionally molded. Furthermore, at this timing, the molding table 202 is moved in a direction of moving away from the head portion 12 while aligning the position of the surface to be molded of the molding object 50 and the nozzle position according to the advancement of molding. Thus, as shown in the figure, the position (position in the layering direction) of the opposing surface of the molding table 202 is a position away from the nozzle position. In this case, the molding of another molding object cannot be started even if there is an empty space on the molding table 202.

On the other hand, in the present alternative embodiment, as shown in FIG. 11(b), for example, the operation of molding is temporarily stopped, and the additional molding table 252 is installed on the molding table 202 at the timing the molding of the molding object 50 on the molding table 202 is advanced partway. Thus, the starting position (position in the layering direction) of the molding of the molding object to be molded additionally is aligned with the nozzle position, as shown in the figure. After the installation of the additional molding table 252, as shown in FIG. 11(c), the operation of molding is resumed, and the molding of the molding object 50 denoted with the reference numeral B is carried out on the additional molding table 252 simultaneously in parallel with the molding of the molding object 50 denoted with the reference numeral A.

According to such configuration, for example, the molding of another molding object 50 can be appropriately started during the molding of the molding object 50 on the molding table 202. Thus, for example, when the instruction of new molding is accepted by the molding device 10 during the molding of the molding object 50 on the molding table 202, and the like, the additional molding can be appropriately carried out without waiting for the molding of the molding object 50 being molded to be completed. In this case, when referring to the molding device 10 accepting the instruction of new molding, this means that, for example, the molding device 10 accepts a job corresponding to another molding object 50. Furthermore, in this case, the molding can be efficiently carried out with the molding object 50 being molded and the molding object 50 to newly start molding arranged side by side within a plane parallel to the opposing surface by using the additional molding table 252.

As described above, the molding device 10 carries out the molding of the molding object 50 based on the slice data. Thus, when carrying out the additional molding, consideration is made to carry out synthesis of slice data, and the like based on the slice data indicating the molding object 50 being molded and the slice data indicating the molding object 50 to newly start the molding.

Figure 11D:
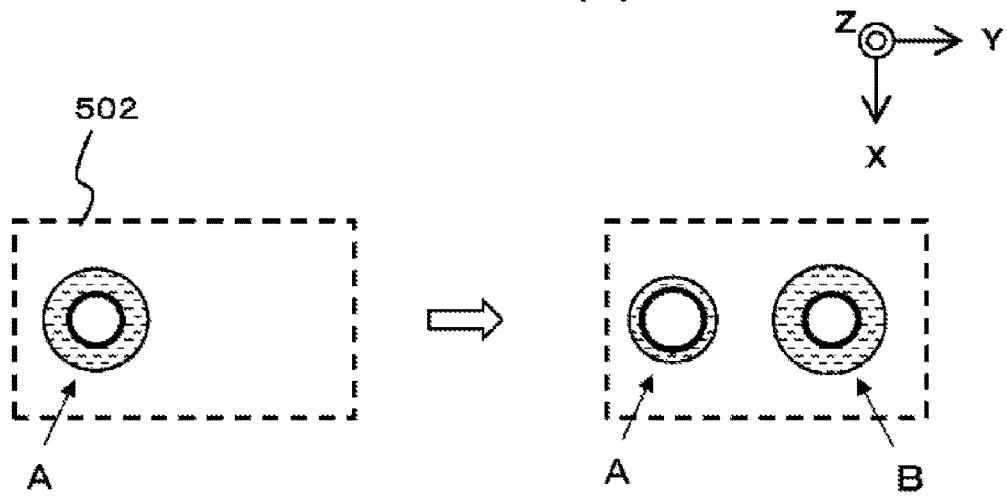

FIG. 11(d) is a view schematically showing a manner of synthesizing the slice data carried out in the present alternative embodiment. In the figure, the figure on the left side is a view schematically showing the surface to be molded at the timing before starting the additional molding. In this case, the slice data becomes data indicating only the cross-section of the molding object 50 denoted with the reference numeral A, as shown in the figure. Furthermore, in the figure, the view on the right side is a view schematically showing the surface to be molded at the timing after starting the additional molding. In this case, the slice data becomes data indicating the cross-section of the molding object 50 denoted with the reference numeral A and the cross-section of the molding object 50 denoted with the reference numeral B, as shown in the figure.

Thus, in the present alternative embodiment, the additional molding is carried out by using the slice data indicating a plurality of molding objects 50. In this case, before starting the additional molding, the slice data indicating the molding object 50 being molded and the slice data indicating the molding object 50 to newly start the molding are synthesized to generate new slice data (synthesized data) indicating the plurality of molding objects 50. Furthermore, the molding device 10 thereby carries out the molding of the plurality of molding objects 50 based on the synthesized data after starting the additional molding. According to such configuration, for example, the operation of additional molding can be appropriately controlled.

The synthesis of the slice data is not limited to when using the additional molding table 252 as in the present alternative embodiment, and can be similarly carried out even when carrying out the additional molding through other methods. For example, consideration is made to similarly carry out the synthesis of the slice data even when carrying out the additional molding using the plurality of molding tables 202 as in the configurations described using FIGS. 1(a) to 9(c).

Moreover, in the present alternative embodiment, the additional molding is carried out with the molding object 50 being molded and the molding object 50 to newly start the molding arranged side by side within a plane parallel to the opposing surface, as described above. In this case, whether or not a space for carrying out the additional molding can be ensured, and the like needs to be checked before starting the additional molding. Thus, the control of the operation of molding carried out in the present alternative embodiment will be described in further detail below including such points.

Figure 12:
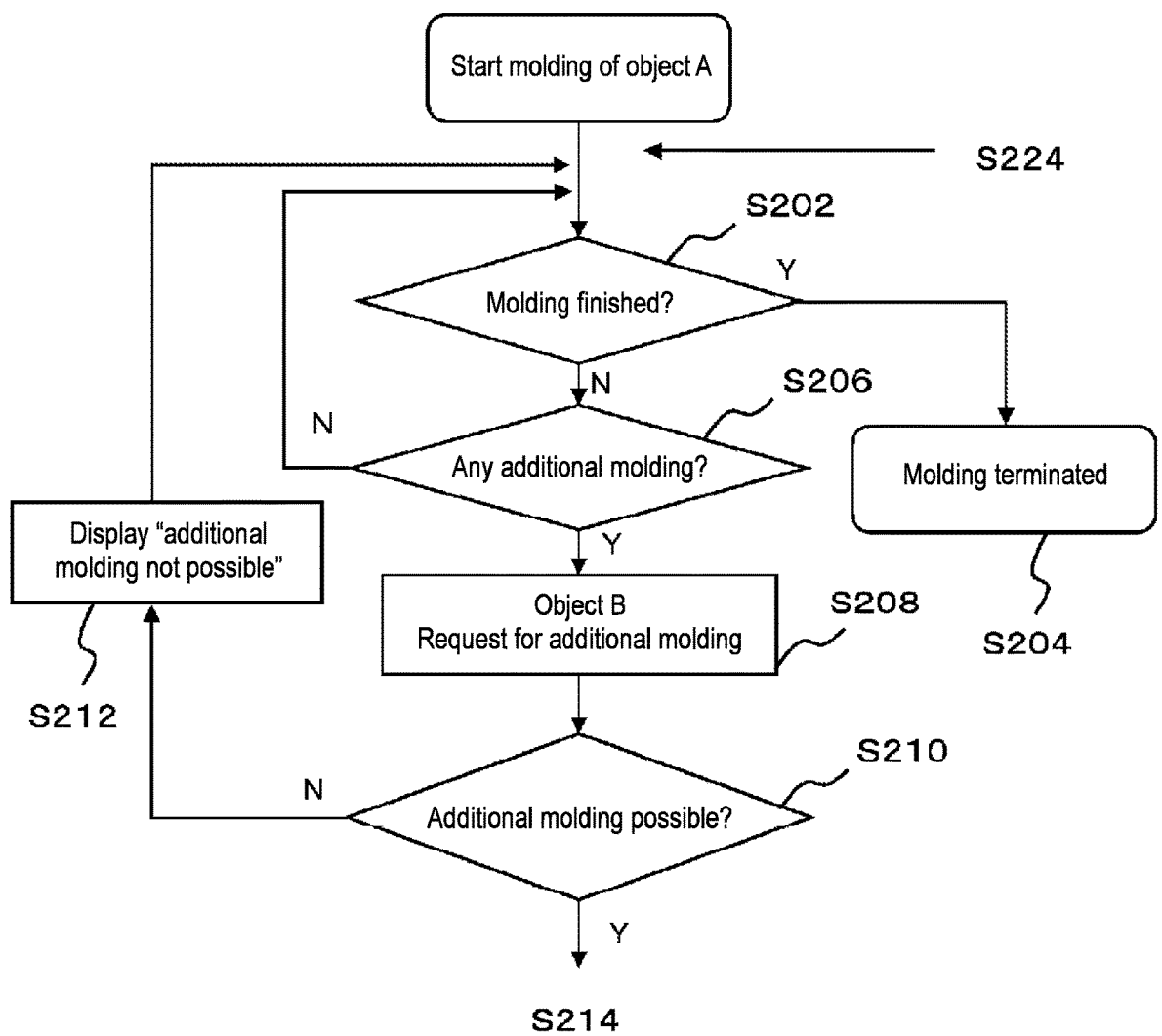
FIG. 12 is a flowchart showing one example of a control of the operation of molding.
Figure 13:
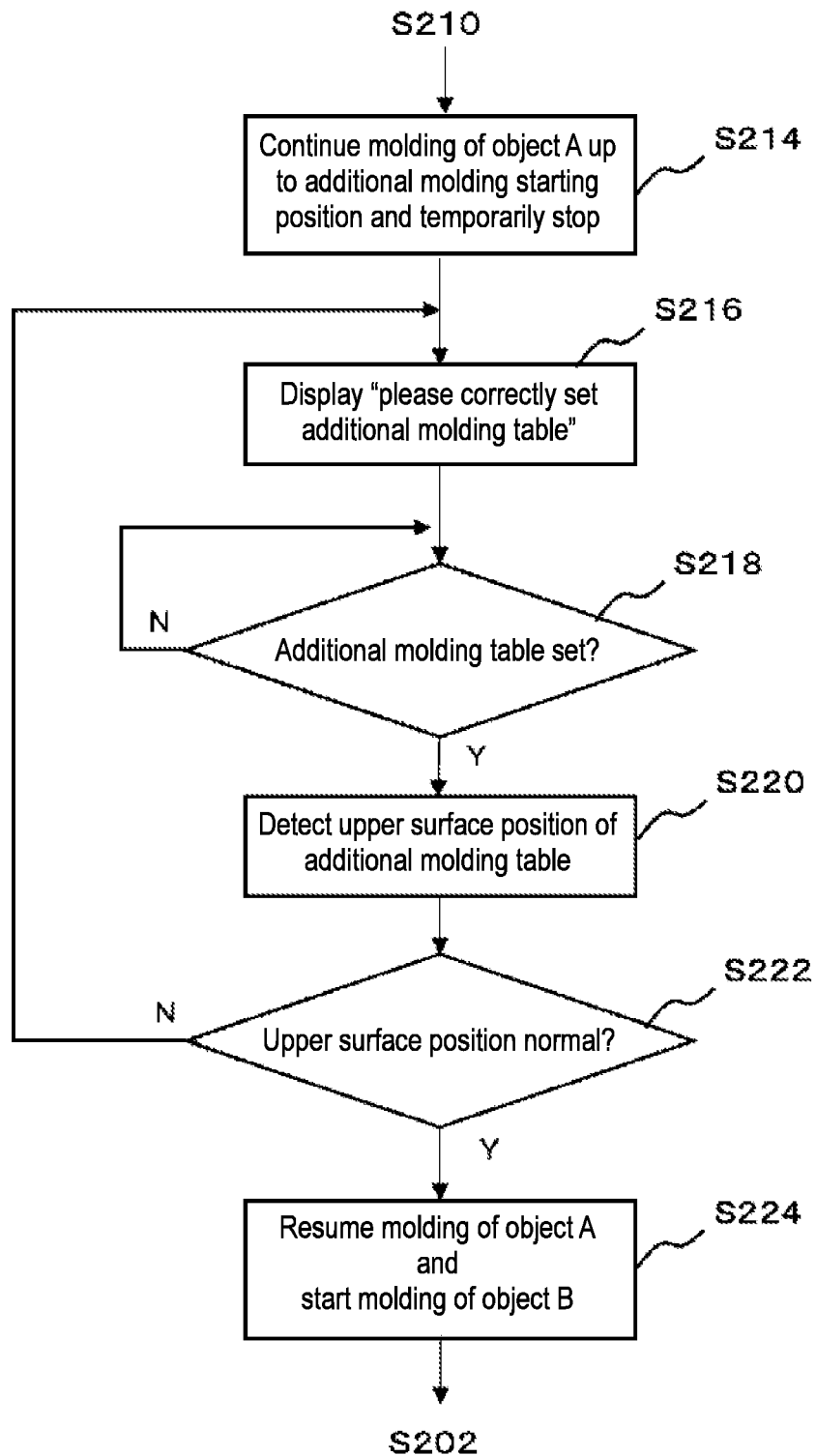
FIG. 13 is a flowchart showing one example of a control of the operation of molding.

FIGS. 12 and 13 are flowcharts showing one example of the control of operation of molding, and show one example of the operation of the molding device 10 of when carrying out the additional molding using the additional molding table 252. Furthermore, in the flowchart, one example of the operation after (after molding start) starting the molding of an object A, which is the first molding object 50, on the molding table 202. In this case, after the molding start of the object A, the molding device 10 checks whether or not the molding is finished at a predetermined timing (S202). In this case, when referring to the molding being finished, this means that, for example, the molding of all the molding objects 50 to be molded with the molding device 10 is completed. Furthermore, the molding object to be molded with the molding device 10 is, for example, a molding object corresponding to the job accepted by the molding device 10. When determined that the molding is finished with the molding device 10 (S202: Y), the operation of molding is terminated (S204).

When determined that the molding is not finished in step S202 (S202: N), for example, whether or not the molding object 50 to be additionally molded is present is further checked by checking whether or not the molding device 10 accepted a new job (S206). When determined that the molding object 50 to be additionally molded is not present (S206: N), the process is returned to step S202, and the subsequent operations are repeated. The operation of molding is thereby continued.

When determined that the molding object 50 to be additionally molded is present in step S206 (S206: Y), a request for additional molding of molding a molding object 50 (object B) different from the molding object 50 (object A) being molded (being processed) is processed (S208), and whether or not the operation of additional molding is possible is determined (S210). In this determination, for example, determination is made on whether or not a space for molding another molding object 50 (object B) to be additionally molded is provided in addition to the space (space) occupied by the molding object 50 (object A) already being molded in a region where the molding of the molding object 50 can be carried out in the molding device 10. More specifically, consideration is made to carry out the determination on whether or not the additional molding table 252 to use at the time of molding of the object B can be installed on the molding table 202 for such determination.

When determined that the additional molding cannot be carried out due to lack of space, and the like, for example, in step S210 (S210: N), a display indicating that the additional molding is not possible (display of "additional molding not possible") is made, and the process is returned to step S202. The operation of molding is continued by repeating the subsequent operations. Furthermore, when determined that the additional molding is possible in step S210 (S210: Y), the process proceeds to step S214, and the operation of additional molding is carried out.

When carrying out the additional molding, a position corresponding to the height L of the additional molding 252 installed on the molding table 202 is set to the starting position (additional molding starting position) of the molding in the layering direction. Thus, in this case, the molding of the molding object 50 (object A) being molded is advanced to the height corresponding to the additional molding starting position, and the operation of molding is temporarily stopped at the relevant position (S214). Then, the installation of the additional molding 252 on the molding table 202 is urged to the user of the molding device 10 by displaying, for example, "please correctly set additional molding table" (S216). After urging the installation of the additional molding table 252, for example, whether or not the additional molding table 252 is installed is repeatedly checked at a constant period and the user waits until the additional molding table 252 is installed (set) (S218: N).

Furthermore, after the additional molding table 252 is installed (S218: Y), the position (upper surface position) of the upper surface of the additional molding table 252 in the layering direction is detected (S220), and whether or not the upper surface position is normal is checked (S222). In this case, when referring to the upper surface position of the additional molding table 252 being normal, this means that, for example, the position stored in advance as the upper surface position of when the additional molding table 252 is correctly installed and the detected upper surface position match within a predetermined tolerable range. When determined that the upper surface position is not normal in step S222 (S222: N), the process is returned to step S216, and the subsequent operations are repeated. The installation of the additional molding table 252 is then urged to the user again.

When determined that the upper surface position is normal in step S222 (S222: Y), the molding of the molding object 50 (object A), which molding is temporarily stopped, is resumed, and the molding of the new molding object 50 (object B) is started (S224). The operation of the additional molding is thereby started. Thereafter, the process is returned to step S202, and the subsequent operations are repeated. Thus, the operation of molding after the start of the additional molding is continued. According to such configuration, for example, the operation of additional molding can be appropriately carried out.

Figure 14A:
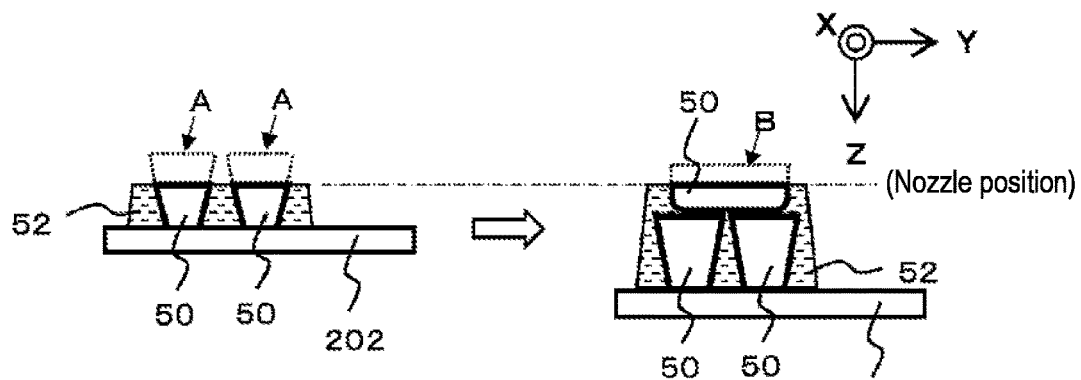
FIGS. 14(a) to 14(c) are views describing a further alternative embodiment of the configuration, the operation, and the like of the molding device 10.
Figure 14B:
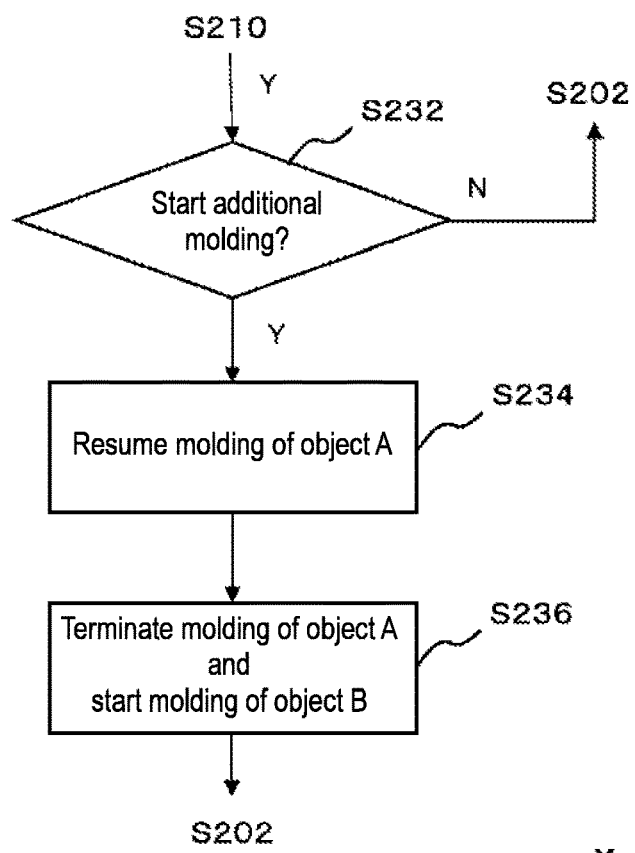
Figure 14C:
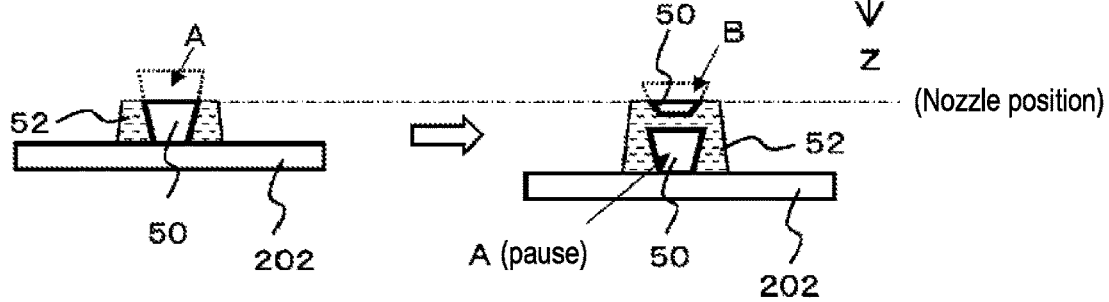

Next, a further alternative embodiment, and the like of the operation of additional molding will be described. FIGS. 14(a) to 14(c) are views describing a further alternative embodiment of the configuration, the operation, and the like of the molding device 10. Other than the points described below, in FIGS. 14(a) to 14(c), a configuration denoted with the same reference numerals as FIGS. 1(a) to 13 may have a feature same as or similar to the configuration in FIGS. 1(a) to 13.

FIG. 14(a) schematically shows an alternative embodiment of the additional molding. In the description made above, an arrangement of when the molding object 50 being molded and the molding object 50 to newly start the molding are lined in a lateral direction (horizontal direction) within a plane parallel to the opposing surface of the molding table 202 has been mainly described for the arrangement of such molding objects 50. In this case, the plurality of molding objects 50 are simultaneously molded in parallel, as described above. However, when considered from a standpoint of accepting an instruction of molding for a new molding object during the molding of the molding object 50, which molding started first, for example, consideration is made to first accept only the instruction of molding of the new molding object, and have the timing to actually start the molding of the new molding object to after the molding of the molding object 50 which molding started first is completed, and the like.

More specifically, for example, in the operation shown in FIG. 14(a), an instruction to mold another molding object 50 is accepted during the molding of the molding object 50 denoted with the reference numeral A as with the timing shown on the left side of the figure. After the molding of the molding object 50 denoted with the reference numeral A is completed, the molding of another molding object is started. In this case, for example, the another molding object 50 to be molded by additional molding like the molding object 50 denoted with the reference numeral B in the right side of the figure is overlapped on the molding object 50 (above in the layering direction) which molding is completed.

Even when configured in such manner, for example, an instruction to mold another molding object 50 can be appropriately accepted while molding the molding object 50 which molding started first. Furthermore, in this case, the molding of a plurality of molding objects 50 is continuously carried out, and the plurality of molding objects 50 are molded lined in the layering direction (up and down direction) by starting the molding of another molding object 50 after the molding of the molding object 50 which molding started first is completed. Even when configured in such manner, for example, the additional molding can be appropriately carried out.

When configured in such manner, for example, the time required for molding becomes the sum of the time required for the molding of each molding object 50, and thus is not greatly reduced. In this case, however, the molding of the plurality of molding objects 50 can be automatically carried out thereafter once the instruction of additional molding is made at an arbitrary timing. Thus, for example, the molding object 50 to be molded next can be specified in advance, and the like when a user moves away from the vicinity of the molding device 10 for a long time, and the like. In this case as well, the molding of the next molding object 50 can be specified during the molding of the molding object 50 which molding started first, and thus, for example, the instruction of additional molding can be made at an arbitrary timing even when the molding of another molding object 50 becomes necessary after the start of the molding of the previous molding object 50. Thus, even when configured in such manner, the plurality of molding objects 50 can be more efficiently molded by carrying out the additional molding. In this case, for example, the additional molding can be carried out without using the plurality of molding tables 202, the additional molding tables 252, and the like by carrying out the additional molding so that the plurality of molding objects 50 are lined in the up and down direction. Thus, according to such configuration, for example, the additional molding can be carried out with an easier configuration.

When carrying out the additional molding in such manner, consideration is made to change one part of the operation of molding by the molding device 10 described using FIGS. 12 and 13. FIG. 14(b) is a flowchart showing one example of the operation of when carrying out the additional molding so that the plurality of molding objects 50 are lined in the up and down direction, and shows one example of a modified portion from the flowchart shown in FIGS. 12 and 13.

In this case as well, each step (steps S202 to S212) shown in FIG. 12 carry out the corresponding operation in the same or similar way. The operations after the operation corresponding to step S214 are differed from the case shown in FIG. 13. More specifically, in this case, for example, whether or not to start the additional molding is checked in continuation to the operation corresponding to step S210 (S232). When determined to not carry out the additional molding (S232: N), the process is returned to the step corresponding to step S202, and the subsequent operations are repeated.

When determined to start the additional molding in step S232 (S232: Y), the molding of the molding object 50 (object A) which molding started first is resumed (S234). In this case, when referring to resuming the molding, this means, for example, continuously carrying out the operation of molding of the molding object 50 carried out before the start of the additional molding. Furthermore, in this case, the molding object 50 (object B) to be additionally molded is in a molding standby state waiting for the operation of molding until the molding of the molding object 50 (object A) is completed.

Furthermore, in this case, the molding of the next molding object 50 (object B) is started at the timing the molding of the molding object 50 (object A) which molding started first is terminated (completed) (S236). The process is then returned to the step corresponding to step S202 shown in FIG. 12, and the subsequent operations are repeated. The molding of the next molding object 50 is then carried out. According to such configuration, for example, the molding of the molding object 50 (object B) can be automatically started after the completion of the molding of the molding object 50 (object A) which molding started first. Furthermore, for example, the operation of additional molding thus can be appropriately carried out.

In the description made above, the configuration of molding the plurality of molding objects 50 lined in the lateral direction by simultaneously carrying out the molding of the plurality of molding objects 50 in parallel, the configuration of continuously carrying out the molding of the plurality of molding objects 50 and molding the plurality of molding objects 50 lined in the up and down direction, and the like have been mainly described as a configuration for carrying out the additional molding. In the alternative embodiment of the operation of the molding device 10, for example, consideration is made to select whether to line the plurality of molding objects 50 in the lateral direction or to line the plurality of molding objects 50 in the up and down direction, and carry out the additional molding through the selected method.

More specifically, in this case, for example, when receiving an instruction to mold a new molding object 50 during the molding of a molding object 50, whether or not to simultaneously carry out the molding of the plurality of molding objects 50 in parallel is determined in the controller of the molding device 10. In this case, for example, consideration is made to make the determination according to the selection of the user. Furthermore, for example, whether or not to simultaneously carry out the molding of the plurality of molding objects 50 in parallel may be determined based on the shape and the like of the molding object 50 being molded and the molding object 50 to be molded in the additional molding. In this case, consideration is made to determine whether or not the molding can be simultaneously carried out in parallel by lining the molding objects laterally based on the height, the width (cross-sectional area) and the like of each molding object 50.

When determined to simultaneously carry out the molding in parallel, the molding of a new molding object 50 is started before the molding of the molding object 50 already being molded is completed according to the determination. Thus, the molding device 10 lines the plurality of molding objects 50 in the lateral direction, and simultaneously molds the molding objects in parallel. Furthermore, when determined to not simultaneously carry out the molding of the plurality of molding objects 50 in parallel due to lack of space to line the plurality of molding objects 50 laterally, and the like, the plurality of molding objects 50 are molded so as to be lined in the up and down direction by sequentially carrying out the molding of the plurality of molding objects 50. In this case, the molding device 10 starts the molding of a new molding object 50 after the molding of the molding object 50 which molding started first is completed. According to such configuration, for example, the molding of the plurality of molding objects 50 can be more appropriately carried out according to the shape, and the like of the molding object 50 to mold.

Next, a further alternative embodiment of the operation of molding carried out by the molding device 10 will be described. In the description made above, the operation of additional molding of molding a new molding object 50 in addition to the molding object 50, which molding started first, has been described for the operation of the molding device 10 accepting the instruction of new molding during the molding of the molding object 50 which molding started first. However, considering from the standpoint of the molding device 10 accepting the instruction of new molding during the molding of the molding object 50 which molding started first, consideration is made to cancel the molding of the molding object 50, which molding started first, without necessarily completing the molding thereof.

FIG. 14(c) schematically shows a further alternative embodiment of the operation of molding. In the figure, the molding object 50 denoted with the reference numeral A is the molding object 50 which molding started first. Furthermore, the molding object 50 denoted with the reference numeral B is the molding object 50, which instruction of molding is accepted by the molding device 10 during the molding of the molding object 50 denoted with the reference numeral A. Furthermore, in the figure, the view on the left side is a view showing one example of a state during the molding of the molding object 50 denoted with the reference numeral A. The view on the right side shows one example of a state after the molding of the molding object 50 denoted with the reference numeral A is stopped and the molding of the molding object 50 denoted with the reference numeral B is started.

In this case, after accepting the instruction of molding for the molding object 50 denoted with the reference numeral B, the molding device 10 stops the molding of the molding object 50 denoted with the reference numeral A. In this case, for example, consideration is made to stop the molding of the molding object 50, and the like based on the instruction of the user. Furthermore, after stopping (pausing) the molding of the molding object 50, for example, the molding device 10 starts the molding of the molding object 50 denoted with the reference numeral B on the molding object 50 molded partway according to the instruction of the user. Even when configured in such manner, the operation of molding for the new molding object 50 can be appropriately started based on the instruction of new molding accepted during the molding of the molding object 50. Thus, for example, the operation of molding desired by the user can be more appropriately executed.

Next, the operation of detaching the molding object 50, which molding is completed, from the molding device 10, and the like will be described in further detail. FIGS. 15(a) to 17 are views showing one example of the operation of detaching the molding object 50 from the molding device 10, and show one example of an operation of when moving the molding table 202 on which the molding of the molding object 50 is completed in the sub-scanning direction so as to obtain a state in which the completed molding object 50 can be easily detached for the case of using the molding object supporter 14 including the plurality of molding tables 202. The configurations shown in FIGS. 15(a) to 17 can be considered as alternative embodiments of the molding device 10 in which the configuration of one part is differed with respect to the molding device 10 shown in FIGS. 1(a) and 1(b) and the like.

Figure 15A:
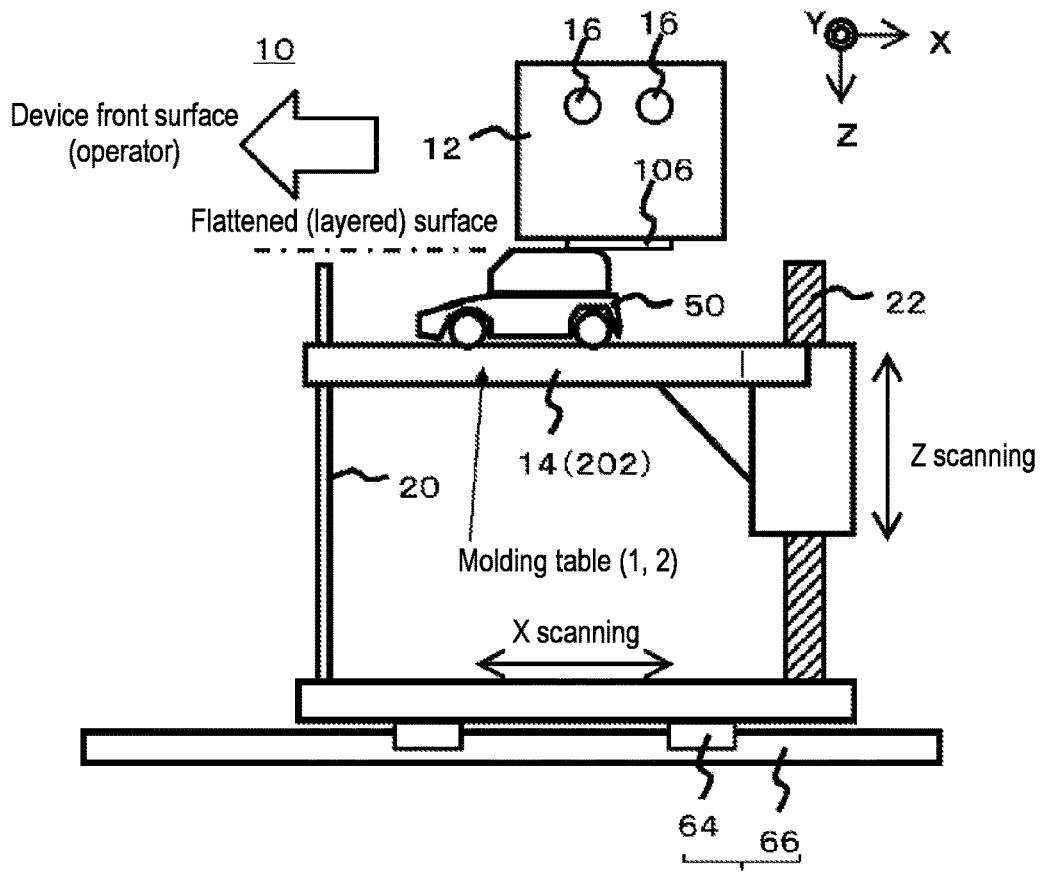
FIGS. 15(a) and 15(b) are views showing one example of an operation of detaching the molding object 50 from the molding device 10.

More specifically, in this case, the molding device 10 further includes a linear guide 62 compared to, for example, the molding device 10 shown in FIGS. 1(a) and 1(b), as shown in FIG. 15(a). The linear guide 62 is a guide member that guides the movement of the molding table 202 in the sub-scanning direction (X direction), and includes a guided section 64 and a guiding section 66. The guided section 64 is a member that is moved in the sub-scanning direction with the molding table 202 at the time of the movement of the molding table 202 in the sub-scanning direction, and defines the moving direction of the molding table 202 by moving along the guiding section 66. Furthermore, the guiding section 66 is, for example, a rail member extending in the sub-scanning direction, and guides the movement of the guided section 64 in the sub-scanning direction.

Other than the points described above and below, the molding device 10 in the present alternative embodiment may have a feature same as or similar to the molding device 10 shown in FIGS. 1(a) and 1(b) and the like. For example, other than the points described above and below, in FIGS. 15(a) and 15(b) and the like, the configuration denoted with the same reference numeral as FIGS. 1(a) to 14(c) may have a feature same as or similar to the configuration in FIGS. 1(a) to 14(c). For example, in FIGS. 15(a) and 15(b) and the like, the illustration is made with the configuration of one part for the drive and operation of each portion of the molding device 10 omitted for the sake of convenience of illustration. Thus, the molding device 10 shown in FIGS. 15(a) and 15(b) and the like may, for example, further include each configuration similar to the molding device 10 shown in FIGS. 1(a) and 1(b) and the like other than the configuration shown in the figure. Furthermore, in the present alternative embodiment, the molding object supporter 14 includes a plurality of molding tables 202 independently driven with respect to each other in the sub-scanning direction and the layering direction (Z direction).

FIGS. 15(a), 15(b), 16(a), 16(b), and 17 show one example of a state of the molding device 10 at each timing for a case of detaching the molding object 50 after the molding of the molding object 50 on the molding tables 202 shown as molding tables 1, 2 in the figure is completed. More specifically, FIG. 15(a) shows a state of the molding device 10 at the timing the molding of the molding object 50 on the molding tables 1, 2 is completed for a case of molding the molding object 50 having a shape of an automobile.

Figure 15B:
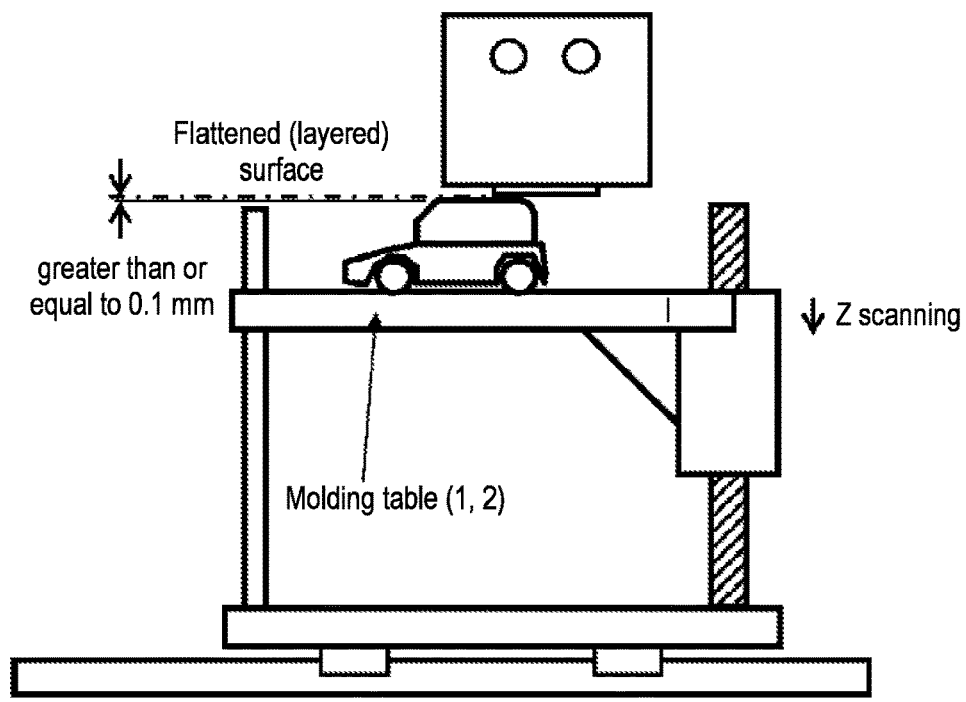

In this case, at the subsequent timing, the molding table 202 (molding tables 1, 2) on which the molding object 50, which molding is completed, is mounted is moved and the molding object 50 is taken out. In such operation, first, as shown in FIG. 15(b), the molding table 202 is moved in a direction of moving away from the head portion 12 so that the flattening roller unit 106 in the head portion 12 and the molding object 50 are not brought into contact. In this case, when referring to preventing the flattening roller unit 106 and the molding object 50 from being brought into contact, this means for example, preventing the upper surface (layering upper surface) of the layer of ink layered in the molding object 50 and the flattening roller unit 106 from being brought into contact at the time of the movement of the molding table 202. Furthermore, in this case, for example, the movement (Z scanning) of the molding table 202 is carried out by the Z scanning driver 36 (see FIGS. 1(a) and 1(b)) in the molding device 10 to move the molding table 202 by greater than or equal to 0.1 mm (e.g., about 0.1 to 5 mm, preferably about 0.5 to 3 mm) in the layering direction. In this case, when referring to moving the molding table 202, this means, for example, moving the molding table 202 on which the molding object 50 subjected to the operation of detachment is mounted. Furthermore, when referring to moving the molding table 202 in the layering direction, this may mean moving at least the upper surface in the molding table 202.

Figure 16A:
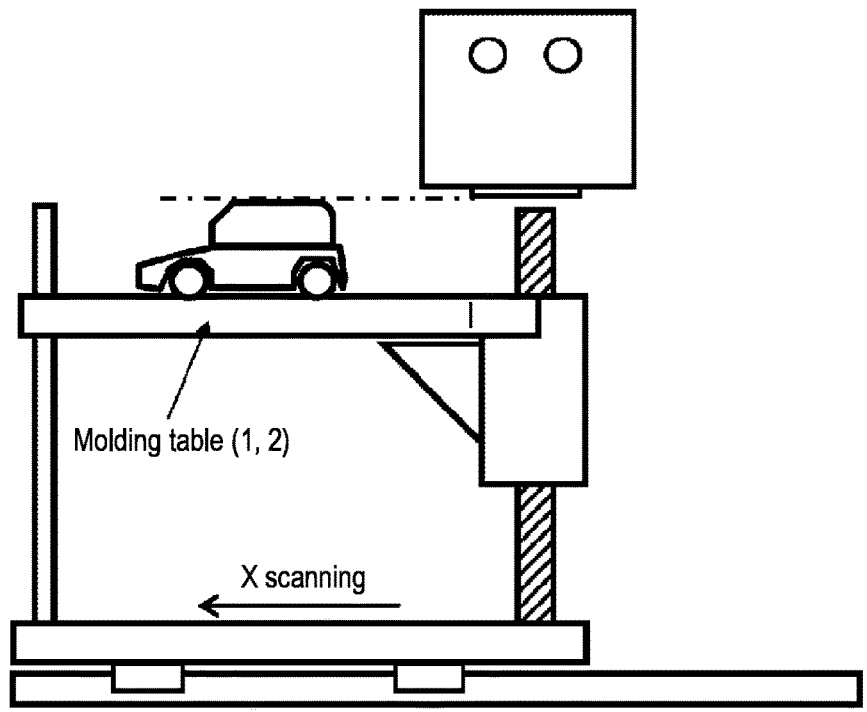
FIGS. 16(a) and 16(b) are views showing one example of an operation of detaching the molding object 50 from the molding device 10.

After moving the molding table 202 in the layering direction, the movement (X scanning) of the molding table 202 is carried out by the X scanning driver 32 (see FIGS. 1(a) and 1(b)) in the molding device 10 to move the molding table 202 in the sub-scanning direction, as shown in FIG. 16(a). Furthermore, in this case, the molding table 202 is moved at least to a position the molding object 50 on the molding table 202 and the head portion 12 are not in an up and down relationship in the layering direction. Thus, for example, the detachment of the molding object 50 to be subsequently carried out can be more easily carried out.

Figure 16B:
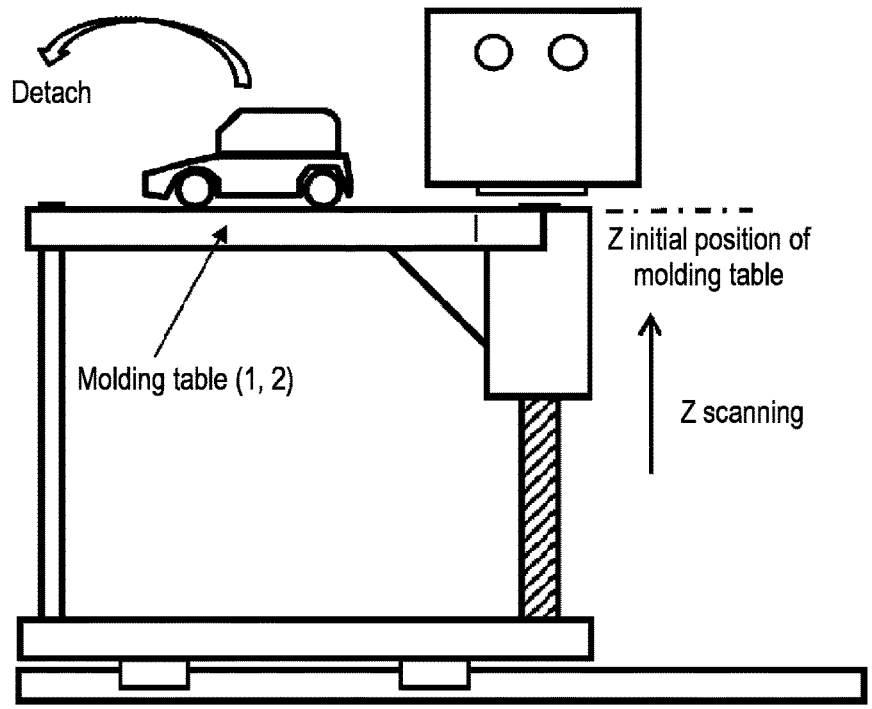
Figure 17:
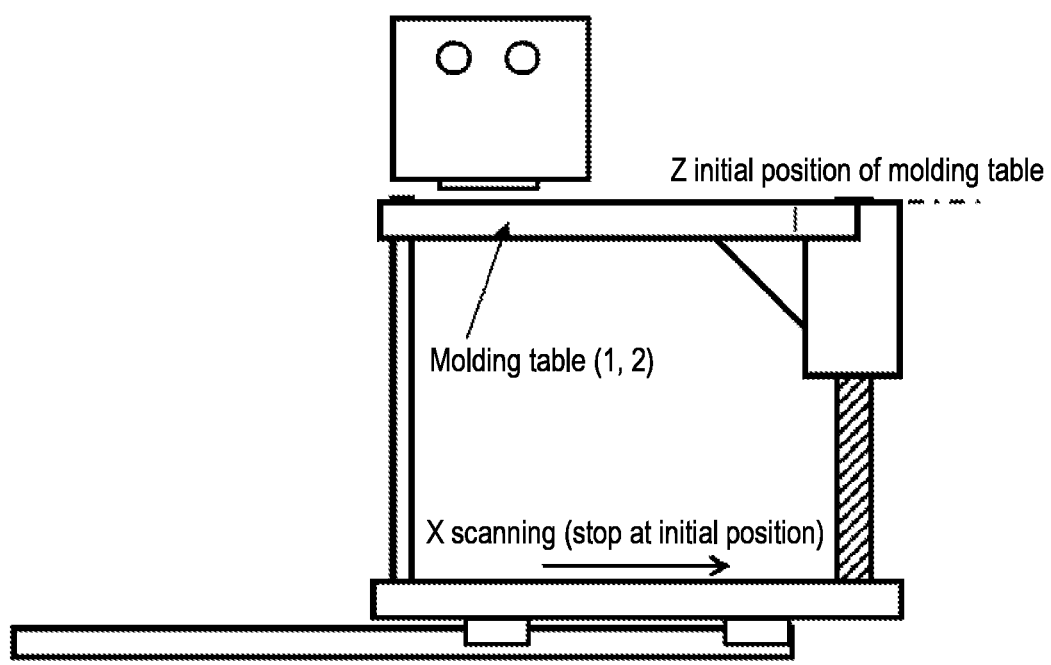
FIG. 17 is a view showing one example of an operation of detaching the molding object 50 from the molding device 10.

Furthermore, after the molding table 202 is moved in the sub-scanning direction, the molding table 202 (molding tables 1, 2) is moved to an initial position (Z initial position, molding object detaching position) in the layering direction and stopped at the relevant position, as shown in FIG. 16(b). The detachment of the molding object 50 is carried out at such stop position. Moreover, after detaching the molding object 50, the molding table 202 (molding tables 1, 2) of after the detachment of the molding object 50 is moved to the initial position in the sub-scanning direction. Then, a standby state of waiting for the next molding is obtained while being stopped at the relevant position.

According to such configuration, for example, the molding object 50, which molding is completed, can be appropriately detached from the molding device 10. Furthermore, after detaching the molding object 50, the new molding can be started as necessary by having the molding table 202 in the standby state. Moreover, in this case, the molding on other molding tables 202 (e.g., molding tables 3, 4) can be continued while taking out the molding object 50 from some molding tables 202 (molding tables 1, 2). More specifically, for example, the molding on other molding tables 202 can be continued even while moving some molding tables 202 (molding tables 1, 2) in the layering direction and the sub-scanning direction, as at the timing shown in FIGS. 15(b) and 16(a). Thus, according to such configuration, the molding of the molding object 50 can be efficiently and appropriately carried out.

As also described above, when using the molding object supporter 14 including the plurality of molding tables 202, consideration is made to, for example, independently drive each molding table 202 only in the layering direction. In such a case, consideration is made to temporarily stop the operation of molding in the entire molding device 10, and take out the molding object 50.

FIGS. 18(a) to 19(b) are views showing another example of the operation of detaching the molding object 50 from the molding device 10, and show one example of the operation of when temporarily stopping the operation of molding in the entire molding device 10 and taking out the molding object 50. Furthermore, the configurations shown in FIGS. 18(a) to 19(b) can be considered as alternative embodiments of the molding device 10 in which the configuration of one part is differed with respect to the molding device 10 shown in FIGS. 1(a) and 1(b) and the like.

Furthermore, as described above, in the present alternative embodiment, each molding table 202 in the molding object supporter 14 carries out only the movement in the layering direction. In this case, the Z scanning driver 36 (see FIGS. 1(a) and 1(b)) individually drives each molding table 202. Furthermore, in the present alternative embodiment, the movement in the main scanning direction and the sub-scanning direction of the relative movement of the head portion 12 with respect to the molding object 50 is carried out by moving the head portion 12 side. Furthermore, other than the points described above and below, the molding device 10 of the present alternative embodiment may have a feature same as or similar to the molding device 10 shown in FIGS. 1(a) and 1(b) and the like. For example, other than the points described above and below, in FIGS. 18(a) and 18(b) and the like, the configuration denoted with the same reference numeral as FIGS. 1(a) to 17 may have a feature same as or similar to the configuration in FIGS. 1(a) to 17. For example, in FIG. 18 FIGS. 18(a) and 18(b) and the like, the illustration is made with the configuration of one part for the drive and operation of each portion of the molding device 10 omitted for the sake of convenience of illustration. Thus, the molding device 10 shown in FIGS. 18(a) and 18(b) and the like may, for example, further include each configuration similar to the molding device 10 shown in FIGS. 1(a) and 1(b) and the like other than the configuration shown in the figure.

Figure 18A:
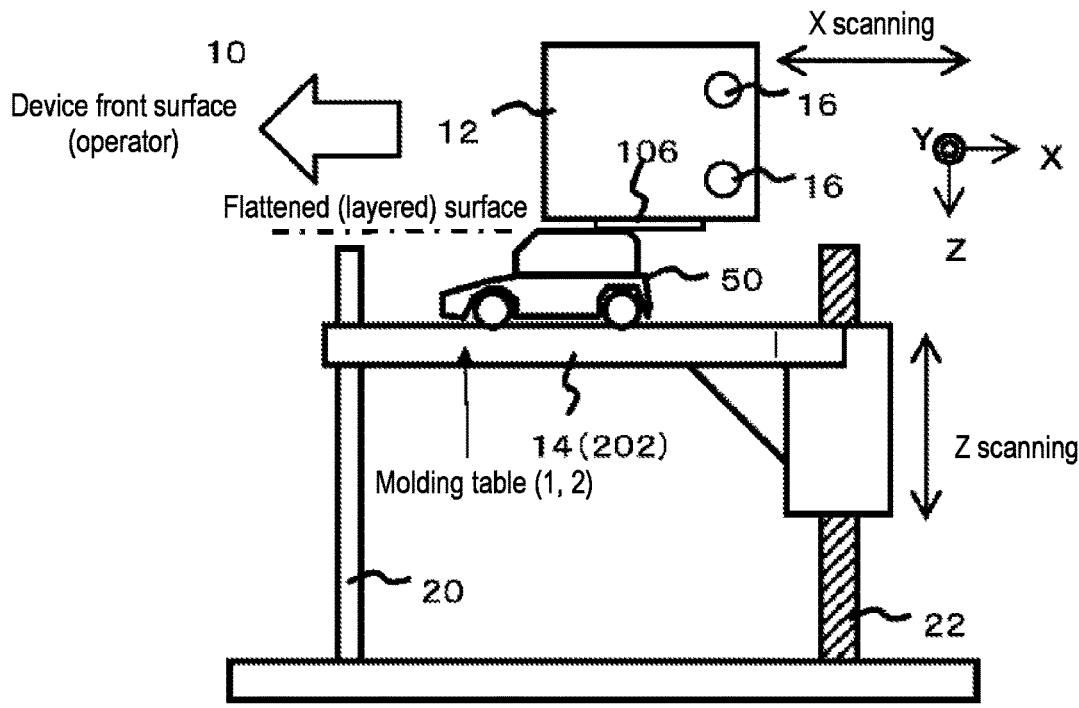
FIGS. 18(a) and 18(b) are views showing another example of an operation of detaching the molding object 50 from the molding device 10.

FIGS. 18(a), 18(b), 19(a) and 19(b) show one example of a state of the molding device 10 at each timing for a case of detaching the molding object 50 after the molding of the molding object 50 on the molding tables 202 shown as molding tables 1, 2 in the figure is completed. More specifically, FIG. 18(a) shows a state of the molding device 10 at the timing the molding of the molding object 50 on the molding tables 1, 2 is completed for a case of molding the molding object 50 having a shape of an automobile. Furthermore, in the present alternative embodiment, the molding device 10 temporarily stops the operation of molding at the relevant timing. In this case, when referring to temporarily stopping the operation of molding, this means, for example, temporarily stopping the operation of molding on all the molding tables 202.

Figure 18B:
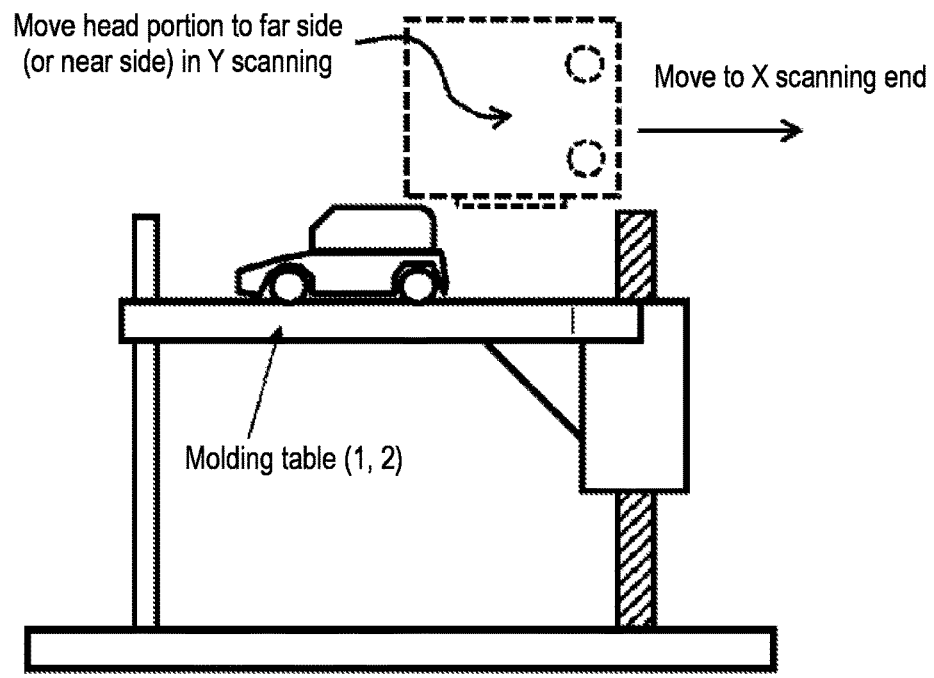

Furthermore, after temporarily stopping the operation of molding, the head portion 12 is moved by the X scanning driver 32 and the Y scanning driver 34 (see FIGS. 1(a) and 1(b)) to evacuate the head portion 12 to the scanning end in the main scanning direction and the sub-scanning direction, as shown in for example, FIG. 18(b). In this case, the scanning end in the main scanning direction and the sub-scanning direction refers to, for example, an end in a range the head portion 12 can be moved in each direction. More specifically, in the case shown in FIG. 18(b), the scanning end (X scanning end) in the sub-scanning direction is the end on the right side in the figure. Furthermore, the scanning end in the main scanning direction is an end on the far side or the near side in the figure.

Figure 19A:
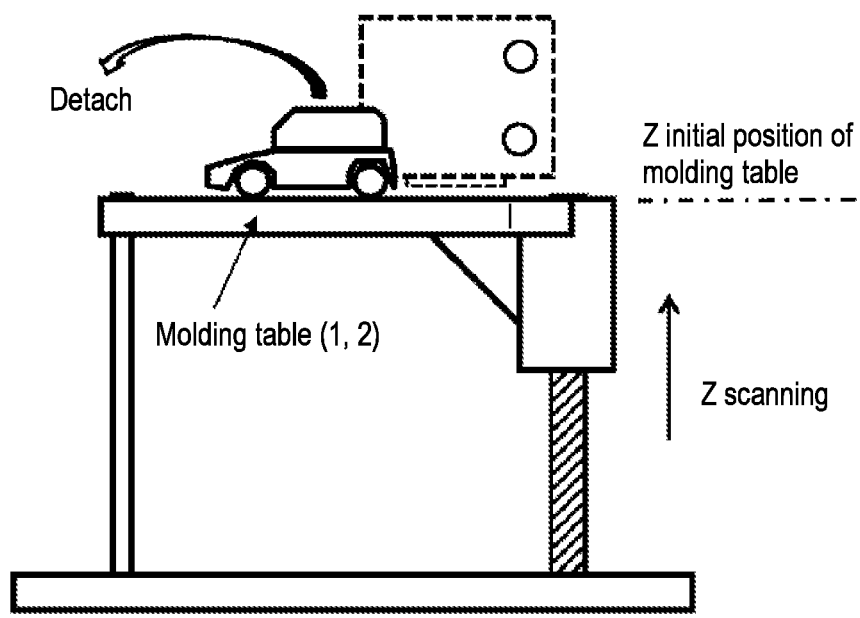
FIGS. 19(a) and 19(b) are views showing another example of an operation of detaching the molding object 50 from the molding device 10.

After moving the head portion 12 to the scanning end in the main scanning direction and the sub-scanning direction, for example, as shown in FIG. 19(a), the molding table 202 (molding tables 1, 2) is moved to the initial position (Z initial position) in the layering direction, which is the detachment position of the molding object in the layering direction. The molding object 50, which molding is completed, is detached from the molding table 202 at this position.

Figure 19B:
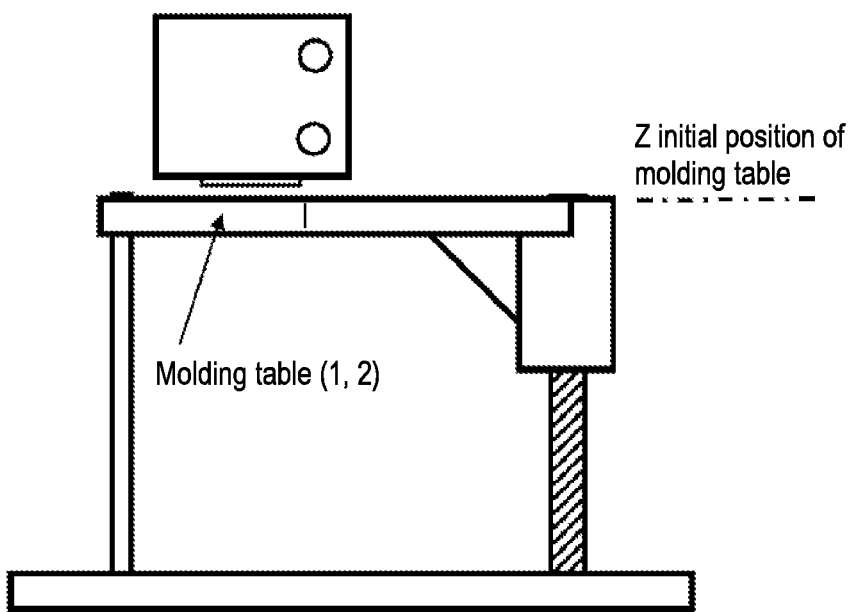

Furthermore, after detaching the molding object 50, for example, as shown in FIG. 19(b), the head portion 12 is moved to the initial position in the layering direction and the sub-scanning direction, and the molding on the molding table 202 on which the molding object 50, which molding is not completed, is mounted is resumed. The molding table 202 (molding table 1, 2) from which the molding object 50 is detached is in the standby state waiting for the next molding. Even when configured in such manner, for example, the molding object 50, which molding is completed, can be appropriately detached from the molding device 10. Furthermore, after detaching the molding object 50, the new molding can be started as necessary by having the molding table 202 in the standby state. Thus, even when configured in such manner, the molding of the molding object 50 can be efficiently and appropriately carried out. In the description made above, the head portion 12 is moved in the sub-scanning direction (X direction) and the main scanning direction (Y direction), so that the molding object 50 which molding is completed can be taken out. However, if sufficient moving distance can be ensured, the molding object 50 can be taken out even if the movement is to only one side of either the sub-scanning direction or the main scanning direction.

Next, supplementary explanation will be made with regards to the configuration, and the like of the molding device 10. When carrying out additional molding by each operation described above, display of progress status of molding, acceptance of instruction of user, and the like are preferably carried out using a screen and the like that display the operation of the molding device 10. In this case, for example, consideration is made to display an icon, and the like that manages the molding object to mold on the screen of the graphical user interface (GUI). In this case, consideration is made to display an icon for instructing additional molding (additional icon), an icon for waiting without immediately starting the molding operation of the additional molding (standby icon), an icon for cancelling the instruction of molding (cancel icon), and the like. Furthermore, in this case, the arrangement and the like of the molding object to be molded with the molding device 10 are preferably displayed on the screen. Moreover, in this case, consideration is made to display the molding object to mold with the additional molding, the molding object in standby, and the like also on the screen. According to such configuration, for example, the control of the operation of additional molding can be more appropriately carried out.

Furthermore, in the points other than those described above, the operation of molding by the molding device 10 can be carried out same as or similar to the known method of molding. More specifically, the layer of ink configuring the molding object 50 can be formed through a method same as or similar to the known method. Furthermore, in this case, consideration is made to set the pass number, which is the number of main scanning operations to carry out with respect to the same position to form one layer of ink, to an arbitrary number (1 pass to N passes) according to, for example, the desired precision (resolution) and the like of the molding.

Furthermore, in the description made above, the case of carrying out the molding through the serial head scheme of causing the head portion 12 to carry out the main scanning operation and the sub-scanning direction has been mainly described. In this case, for example, when the density of the nozzle in the nozzle row in which a plurality of nozzles are lined in the sub-scanning direction is lower than the precision (molding density) required in the molding, when the length (array length) of the nozzle row is smaller than or equal to the width (molding width) of the molding object 50 in the sub-scanning direction, and the like, the necessary number of main scanning operations are carried out to satisfy the molding density and the molding width and the sub-scanning operation of a predetermined feeding amount is carried out every time the main scanning operation is carried out by the multi-pass scheme in which the pass number is in plurals for each inkjet head in the head portion 12.

On the other hand, consideration is made to carry out the operation of molding not through the serial head scheme but through the line head scheme. In this case, the molding device 10, for example, carries out only the scanning (Y scanning) in the Y direction corresponding to the main scanning operation without carrying out the scanning (X scanning) in the X direction corresponding to the sub-scanning direction to form the respective layer of ink. Furthermore, in this case, for example, an inkjet head which density of the nozzle in the nozzle row is greater than or equal to the molding density and the length of the nozzle row is greater than or equal to the molding width is used for each inkjet head in the head portion 12. According to such configuration, for example, one layer of ink can be appropriately formed in one Y scanning without carrying out the X scanning.

INDUSTRIAL APPLICABILITY

The present invention can be suitably used in, for example, a molding device.

The invention claimed is:

1. A molding device that molds stereoscopic molding objects through a layered molding method, wherein the molding device comprises an ejection head that ejects material to form the molding objects, a molding object supporter comprising independently movable molding tables, and a controller configured to:
    start molding a first of the molding objects on a first of the molding tables by scanning the ejection head within a plane parallel to the first molding table while ejecting the material according to slice data for the first object;
    select a second of the molding tables to start molding a second of the molding objects based on which of the molding tables is available for molding the second object and provides the shortest scanning distance for the ejection head to travel;
    assign molding data for the second object to the selected second table; and
    before completing the molding of the first molding object, start molding the second molding object on the second molding table by scanning the ejection head within the plane while ejecting the material according to slice data for the second object, wherein the ejection head is movable in X and Y directions, which are perpendicular with each other, within the plane, and wherein each of the molding tables is movable in a layering direction perpendicular to the plane.

2. The molding device as set forth in claim 1, comprising:
    an ejection scanning driver that causes the ejection head to carry out an ejection scanning operation of relatively moving with respect to the molding objects in a first direction within the plane while ejecting the material; and
    a perpendicular direction driver that moves the molding objects being molded in the layering direction perpendicular to the plane;
    wherein:
    each of the molding tables is movable in the layering direction independently from one another; and
    the perpendicular direction driver moves the molding tables on which respective ones of the molding objects are being molded in the layering direction to move the respective molding objects mounted thereon in the layering direction while the molding objects are being formed.

3. The molding device as set forth in claim 2, wherein:
the molding object supporter includes a plurality of the molding tables lined in the first direction;
the molding device is configured to carry out molding of the molding objects on respective ones of the molding tables lined in the first direction;
when molding the molding objects, the ejection scanning driver causes the ejection head to carry out the ejection scanning operation so that the ejection head passes above the molding tables on which the molding objects are being molded; and
the perpendicular direction driver moves each of the molding tables according to an advancement in an operation of molding respective ones of the objects on each of the molding tables.

4. The molding device as set forth in claim 3, wherein:
in a middle of molding the first molding object on the first table, the molding device starts molding of the second molding object on the second table; and
for starting the molding of the second molding object, the controller selects the second table so that a scanning width for the ejection head in the first direction between the first and second tables is minimized.

5. The molding device as set forth in claim 4, wherein the controller is further configured to:
set a scanning width for the ejection head during the ejection scanning operation according to the width in the first direction of the first table on which the first molding object is being molded; and
reset the scanning width for the ejection head according to the width in the first direction of the second table on which the second molding object is being molded.

6. The molding device as set forth in claim 2, wherein:
the molding of the molding objects is carried out on respective ones of the molding tables;
each of the molding tables is movable independently from each other also in a second direction, which is a direction orthogonal to the first direction and the layering direction;
the molding device further includes a second direction driver that moves each of molding tables in the second direction; and
when the molding of the first molding object is completed, the second direction driver moves the first table on which the first molding object is formed in the second direction.

7. The molding device as set forth in claim 6, further comprising:
a flattening roller that flattens a layer of a material of the first molding object;
wherein:
when moving the first molding table in the second direction:
the perpendicular direction driver moves the first molding table in a direction away from the ejection head so that an upper layer surface of the first molding object and the flattening roller are not brought into contact with one another; and
the second direction driver moves the first molding table in the second direction to a position where the first molding object and the ejection head are not in an up and down relationship in the layering direction.

8. The molding device as set forth in claim 2, wherein the perpendicular direction driver is configured to move a plurality of the molding tables to be aligned in the layering direction for molding at least one of the molding objects over the plurality of aligned molding tables.

9. The molding device as set forth in claim 2, wherein the molding object supporter includes a plurality of the molding tables lined in a second direction, which is a direction orthogonal to the first direction and the layering direction.

10. The molding device as set forth in claim 1, wherein the ejection head is an inkjet head including a nozzle row in which nozzles for ejecting the material are lined.

11. The molding device as set forth in claim 1, wherein each of the plurality of molding tables is detachable independently from one another.

12. The molding device as set forth in claim 1, wherein the first molding table comprises a detachable tray installed on a surface of the first molding table opposing the ejection head.

13. The molding device as set forth in claim 1, wherein when the molding of the first molding object is completed on the first molding table, the molding object is detached from the first molding table, and the controller prepares the first molding table for molding a new one of the molding objects.

14. The molding device as set forth in claim 13, further comprising:
a completed molding object mover that detaches and moves the first molding object, after said molding is completed, from the first molding table.

15. The molding device as set forth in claim 1, wherein:
the slice data for the first and second objects is data indicating a cross-sectional shape of the first and second objects being molded, and
when molding the first and second molding objects on the first and second molding tables, the controller controls the operation of molding based on data in which a plurality of pieces of the slice data corresponding to each of the first and second molding objects are synthesized.

16. The molding device as set forth in claim 1, wherein one or more of the molding tables have different sizes of opposing surfaces thereof facing the ejection head.

17. The molding device as set forth in claim 1, further comprising:
an additional molding table, which is a table-shaped member distinct from and installed on the first molding table; wherein
the ejection head molds another molding object on the additional molding table.

18. The molding device as set forth in claim 17, wherein the molding of first molding object and the molding of the another molding object are simultaneously carried out in parallel.

19. The molding device as set forth in claim 17, wherein:
the molding of the another molding object is carried out based on slice data, which is data indicating a cross-sectional shape of the another molding object being molded; and
when molding the another molding object, the molding of the first molding object and the another molding object is carried out based on data in which the slice data corresponding to the first and another molding objects.

20. The molding device as set forth in claim 17, wherein
the controller determines whether or not to carry out the molding of the first molding object and the molding of the another molding object simultaneously in parallel; and when determined to carry out the molding simultaneously in parallel, the molding of the another molding object is started before the molding of the first molding object is completed to cause the molding device to simultaneously carry out the molding of the first molding object and the molding of the another molding object in parallel.

21. The molding device as set forth in claim 20, wherein
when determined not to carry out the molding of the first molding object and the molding of the another molding object simultaneously in parallel, the controller causes the molding device to start the molding of the another molding object after the molding of the first molding object is completed.

22. The molding device as set forth in claim 20, wherein
the controller determines whether or not to carry out the molding of the first molding object and the molding of the another molding object simultaneously in parallel, according to a selection of a user of the molding device.

23. The molding device as set forth in claim 20, wherein
the controller determines whether or not to carry out the molding of the first molding object and the molding of the another molding object simultaneously in parallel, based on a shape of the first molding object and a shape of the another molding object.

24. The molding device as set forth in claim 1, wherein
while molding at least one molding object, an instruction to mold another molding object is accepted by the controller, and molding of the another molding object is started after the molding of the first molding object is completed so that the another molding object is molded on the first molding object.

\* \* \* \* \*